US012660768B2

(12) United States Patent
Fu

(10) Patent No.: US 12,660,768 B2
(45) Date of Patent: Jun. 23, 2026

(54) METHOD AND SYSTEM FOR CAPABLE OF SELECTING OPTIMAL PLANT CULTIVATION METHOD

(71) Applicant: LAND GREEN AND TECHNOLOGY CO., LTD., Taipei City (TW)

(72) Inventor: Lid Fu, Taipei City (TW)

(73) Assignee: LAND GREEN AND TECHNOLOGY CO., LTD., Taipei City (TW)

( * ) Notice: Subject to any disclaimer, the term of this patent is extended or adjusted under 35 U.S.C. 154(b) by 491 days.

(21) Appl. No.: 18/106,956

(22) Filed: Feb. 7, 2023

(65) Prior Publication Data

US 2023/0180687 A1 Jun. 15, 2023

Related U.S. Application Data

(63) Continuation-in-part of application No. 16/867,544, filed on May 5, 2020, now abandoned.

(51) Int. Cl.
| | |
|---|---|
| *A01G 31/02* | (2006.01) |
| *A01G 25/02* | (2006.01) |
| *C02F 1/00* | (2023.01) |
| *C02F 1/461* | (2023.01) |
| *C02F 1/48* | (2023.01) |
| *C02F 1/78* | (2023.01) |

(52) U.S. Cl.
CPC ........... *A01G 31/02* (2013.01); *A01G 25/023* (2013.01); *C02F 1/001* (2013.01); *C02F 1/461* (2013.01); *C02F 1/48* (2013.01); *C02F 1/78* (2013.01)

(58) Field of Classification Search
USPC ........................ 47/59 R–63, 66.7, 79, 82, 83
See application file for complete search history.

(56) References Cited

U.S. PATENT DOCUMENTS

| | | | | | |
|---|---|---|---|---|---|
| 5,180,552 A | * | 1/1993 | Saceman | .................. | A01G 9/00 |
| | | | | | 422/177 |
| 5,464,456 A | * | 11/1995 | Kertz | ....................... | A47G 7/02 |
| | | | | | 47/60 |
| 6,126,827 A | * | 10/2000 | Johnson, Jr. | ............ | C02F 3/327 |
| | | | | | 210/259 |

(Continued)

FOREIGN PATENT DOCUMENTS

| | | | | | |
|---|---|---|---|---|---|
| KR | 2014065649 | * | 5/2014 | ............. | A01G 31/02 |

*Primary Examiner* — Andrea M Valenti
(74) *Attorney, Agent, or Firm* — Leong C. Lei

(57) ABSTRACT

A plant growing system includes a growth medium preparation unit and a plant growing unit. The growth medium preparation unit includes a supply of water that feeds water through a water treatment unit, a nutrition module, and a reactor sub-system to have the water treated and modified and added with nano-elements and other nutrition components to provide a nutrition formula. The nutrition formula is supplied to the plant growing unit that includes a growing box inside which a tank is provided for receiving and holding the nutrition formula. A plant plate is disposed on the tank and is formed with at least one through opening for receiving and holding a plant. The root of plant is allowed to extend into the nutrition formula inside the tank, while the stem of the plant is growing in a void space above the plant plate and inside the growing box.

20 Claims, 27 Drawing Sheets

(56) References Cited

U.S. PATENT DOCUMENTS

| | | | |
|---|---|---|---|
| 6,725,598 B2 * | 4/2004 | Yoneda | A01G 31/02 |
| | | | 47/60 |
| 11,700,803 B2 * | 7/2023 | Bijl | A01G 27/008 |
| | | | 47/79 |
| 2014/0318012 A1 * | 10/2014 | Fujiyama | A01G 9/249 |
| | | | 47/62 R |
| 2015/0319947 A1 * | 11/2015 | Smith | A01G 31/02 |
| | | | 47/62 A |
| 2016/0212954 A1 * | 7/2016 | Argento | A01G 31/06 |
| 2017/0013810 A1 * | 1/2017 | Grabell | A01G 31/06 |
| 2017/0105368 A1 * | 4/2017 | Mehrman | A01G 31/06 |
| 2017/0305804 A1 * | 10/2017 | Ayers | C12M 37/00 |
| 2018/0332787 A1 * | 11/2018 | Leo | C02F 1/42 |

* cited by examiner

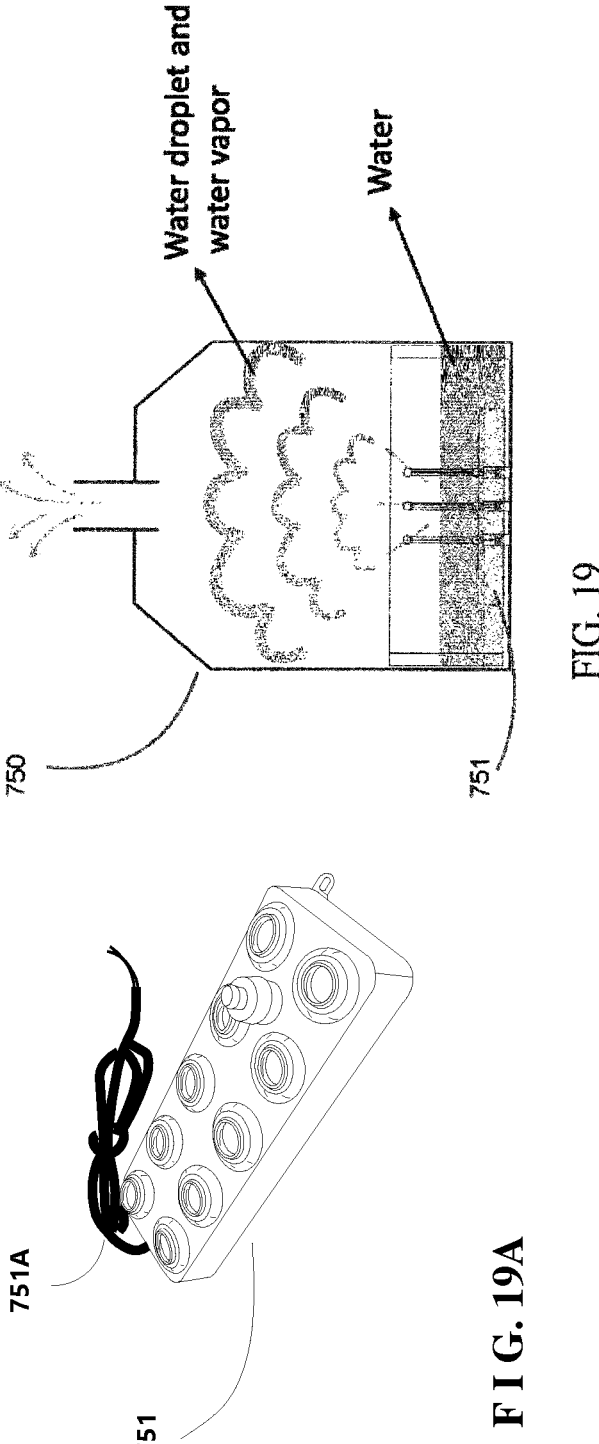
Water droplet and water vapor
Water
750
751
FIG. 19
751A
751
F I G. 19A Water droplet and water vapor

1115E

1115D

1115B

741

1115

1115D

1115C

1115

81 server controller

METHOD AND SYSTEM FOR CAPABLE OF SELECTING OPTIMAL PLANT CULTIVATION METHOD

CROSS REFERENCE TO RELATED APPLICATIONS

This is a continuation-in-part of co-pending U.S. patent application Ser. No. 16/867,544 filed on May 5, 2020, which is a continuation-in-part of U.S. patent application Ser. No. 15/351,447 now abandoned.

TECHNICAL FIELD OF THE INVENTION

The present invention relates to plant cultivation, and more particularly to a method and a system that enable selection of an optimal plant cultivation method.

DESCRIPTION OF THE PRIOR ART

Nowadays there is a problem of food in the world. Insufficient and inadequate diet of a significant part of the world's population has a huge impact on the biological and social aspects of all mankind reproduction.

Millions of people continue to die because of hunger, malnutrition, disease, or of causes related to poor-quality food. For the same reason of poor-quality food, there are growing numbers of different diseases every year including cancers. The sources of such food in many cases are plants. Therefore, to find new, optimal ways to increase productivity and usefulness of plants is getting increasingly important.

While some countries spend big money on researches of new ways to increase the productivity and quality of plants, and at the same time, many people invest their own funds to the different studies, no method or platform is available for selection of an optimal plant cultivation process.

SUMMARY OF THE INVENTION

An object of the present invention is to provide a system that enables selection of an optimal plant cultivation process.

To achieve the object mentioned above, the present invention provides a system that includes a plurality of water supply units, a water treatment unit, a plurality of nutrition units, a reactor, a plurality of gas supply units, a liquid storage unit, at least three growth boxes, an information device, where the plurality of water supply units are used to accommodate a plurality of water sources, the water treatment unit is connected to the water supply units and adapted to filter, purify and modify the water sources, the plurality of nutrition units are used to accommodate nutrition, each nutrient unit is delivered to a mixing device by means of a conveying device, where the mixing device is in connection with the water treatment unit and adapted to mix with the filtered water and nutrition to become nutrition solution; the reactor is in connection with the water treatment unit and mixing device, and adapted to prepare predetermined qualities of nutrition solutions by means of different control actions; the plurality of gas supply units are adapted to accommodate a plurality of gases and supply the gases to the reactor to mix with the filtered, purified and modified water and the nutrition solutions to prepare a nutrition formula for plant roots or stems; the liquid storage unit is in connection with the reactor and water treatment unit, and used to store the nutrition formula and filtered, purified and modified water; each of the at least three growth boxes is used to accommodate plants and in connection with the gas supply units and liquid storage unit, and includes a plurality of controlling elements and a cultivation unit, where the controlling elements are used to control the growth conditions of the plants and the cultivation unit is used to switch selectively among an aeroponic module, drip irrigation module and hydroponic module; the information device is in connection with a servo control unit in a stationary connection or wireless transmission way, and used to control the control actions of the reactor and the operations of the controlling elements of the growth box through the commands of the servo control unit.

Another object of the present invention is to provide a method capable of selecting an optimal plant cultivation method.

To achieve the object mentioned above, the method of the present invention includes:

(a) providing a plurality of participants with a cultivation system capable of selecting an optimal cultivation method for carrying out a plant cultivation competition;

(b) establishing the eligibility of the plant cultivation competition;

(c) establishing a growing method in the plant cultivation competition, the growing method being aeroponics, drip irrigation or hydroponics;

(d) establishing types of plants in the plant cultivation competition;

(e) combining the growing methods with the plant types so as to carry out a variety of plant cultivation competitions, the participants choose the growing methods and plant types;

(f) announcing competition starting date and participants registration period through media, all participants finish registration process and pay an access fee on the website;

(g) giving all participants required seedlings and one incubator containing at least three growing boxes; allowing participants to cultivate seedlings with three different conditions or using three different growth formulas at the same time, which gives more chances to succeed;

(h) adjusting and controlling plant growing conditions, growing methods and nutrition formula in the growth boxes by the participants by selecting a plurality of controlling elements, cultivation units and reactor provided by the plant cultivation system of the optimal plant cultivation method;

(i) choosing the best one growing box out of three and submitting it to selection committee by participants after the competition finishes, the committee selecting the best growing method and nutrition formula, thereby finding out the best cultivation methods of the plants; and (j) selecting the best plant cultivation method according to the types of the plants, and judging and rating the specifications of the types of the plants.

BRIEF DESCRIPTION OF THE DRAWINGS

FIG. 19 is a schematic view showing an air humidifier that is applied to a growth box according to the present invention.

FIG. 19A is a schematic view showing an ultrasonic transducer as a part of the air humidifier according to the present invention.

DETAILED DESCRIPTION OF THE PREFERRED EMBODIMENT

Figure 1:
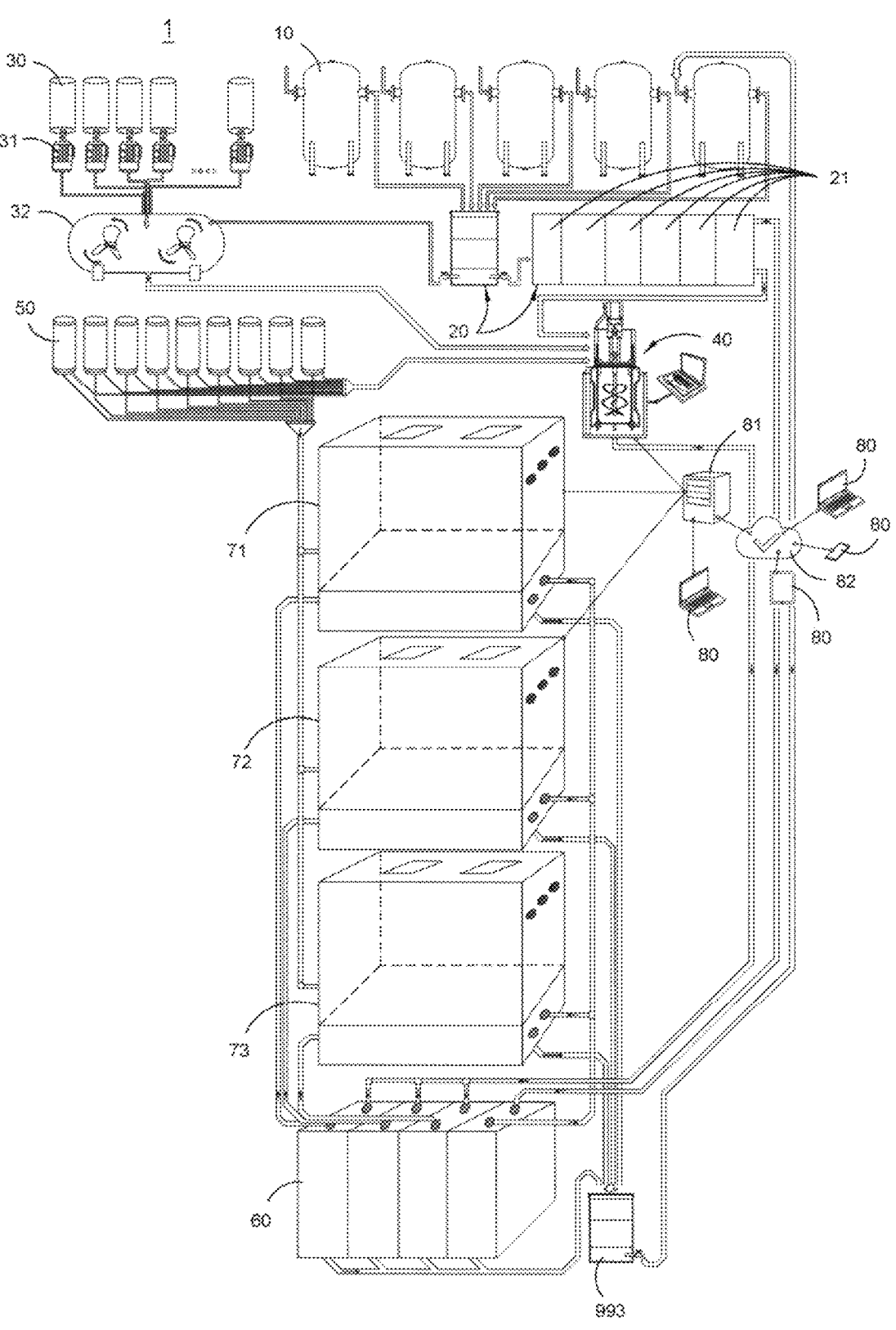
FIG. 1 is a schematic view of a system of a first preferred embodiment according to the present invention.
Figure 2:
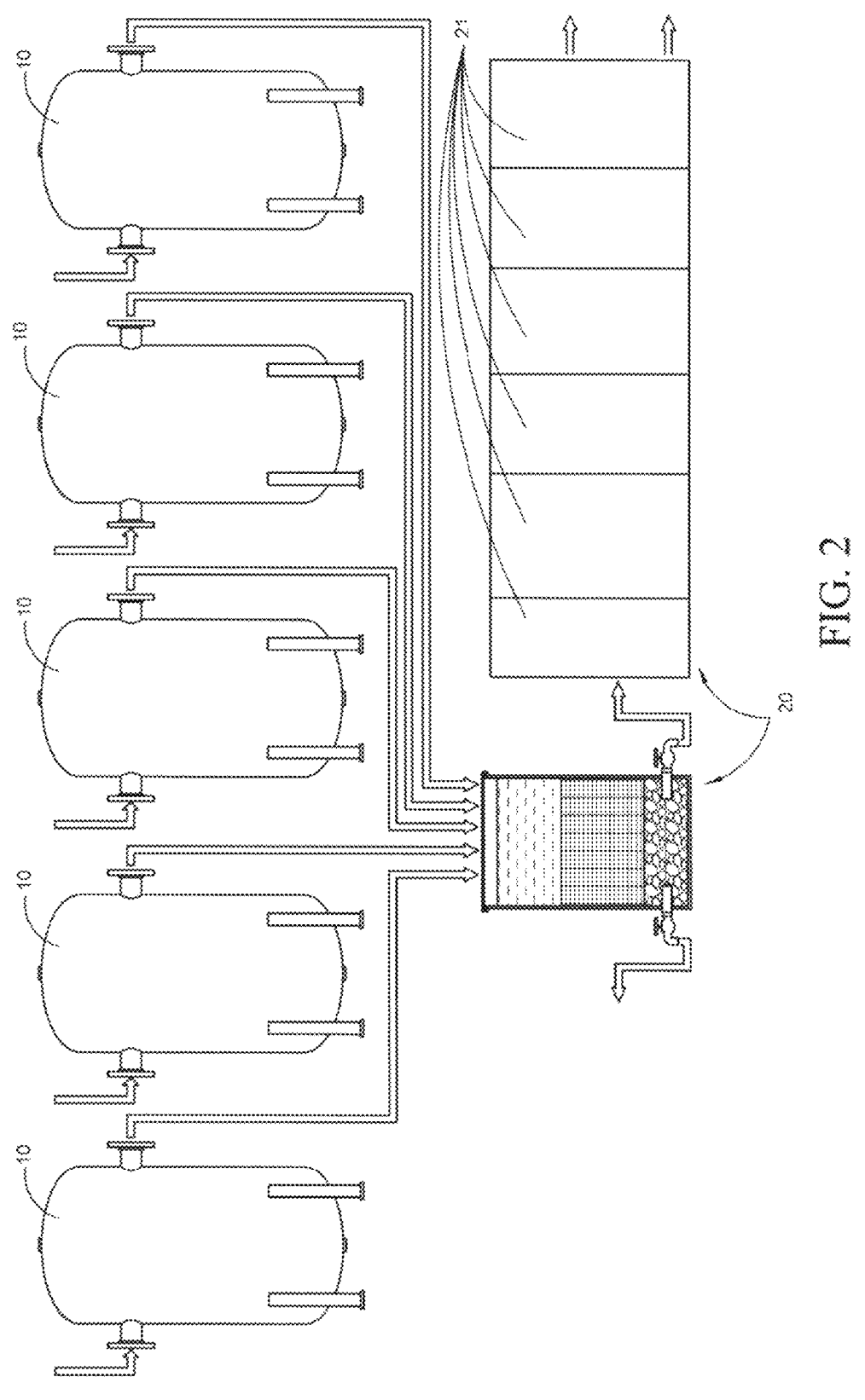
FIG. 2 is a schematic view of water supply units and water treatment unit of the present invention.
Figure 3:
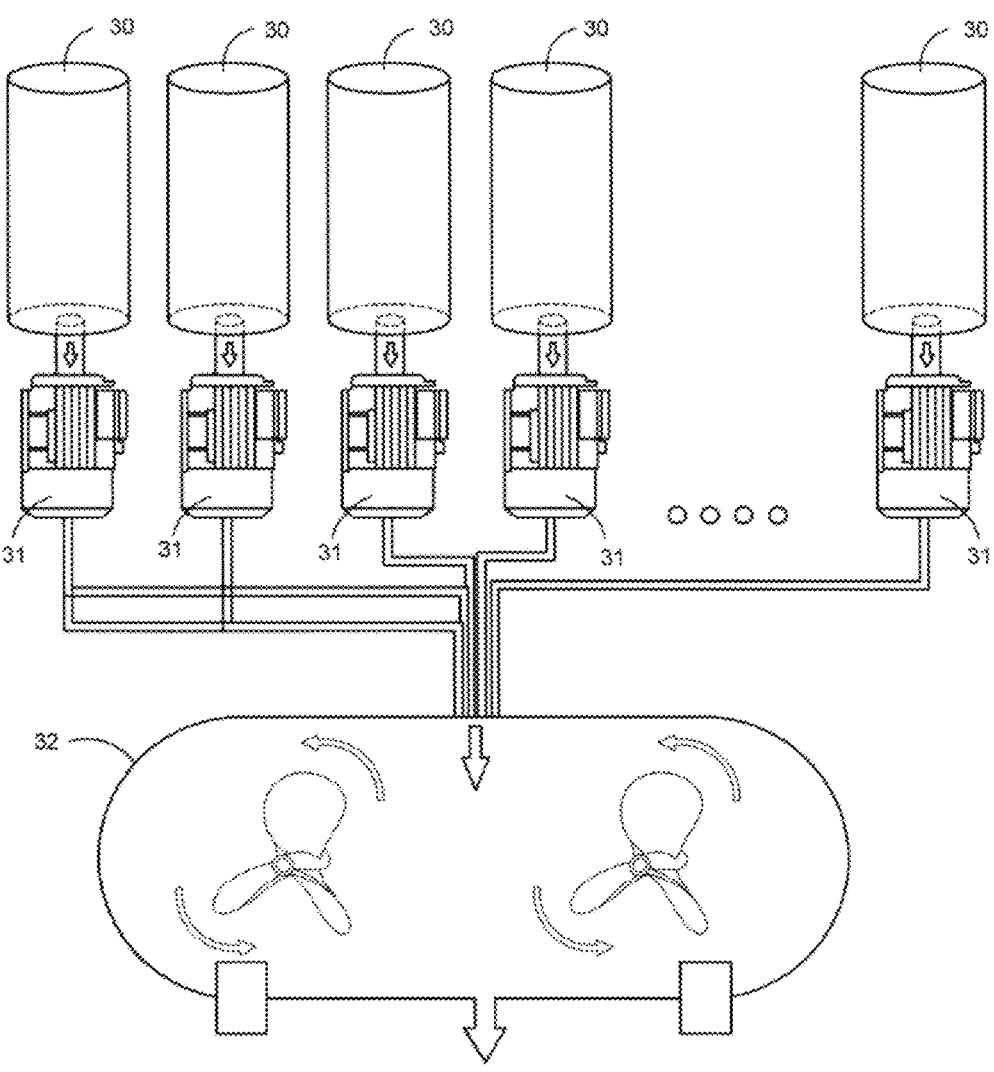
FIG. 3 is a schematic view of a nutrition unit of the present invention.
Figure 4:
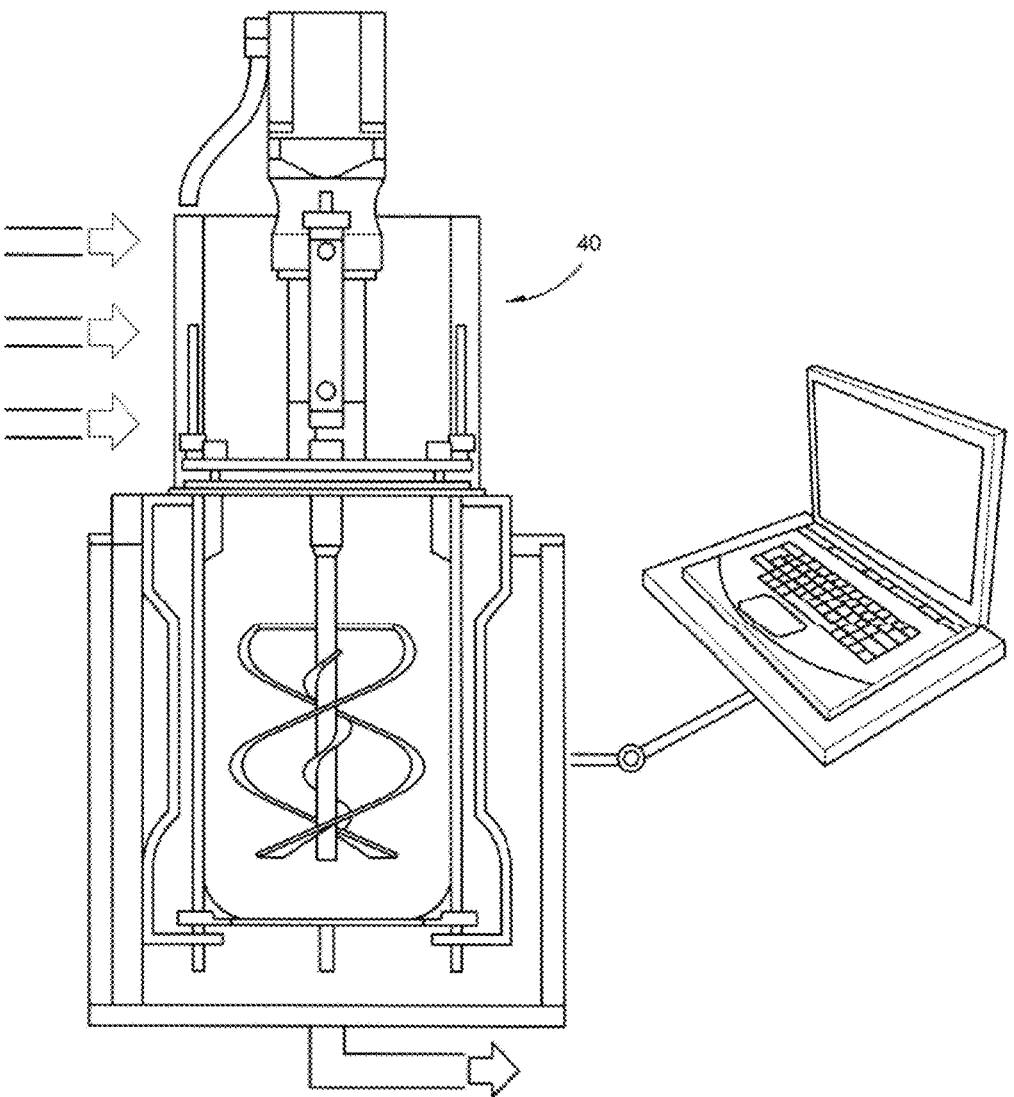
FIG. 4 is a schematic view of a reactor of the present invention.
Figure 5:
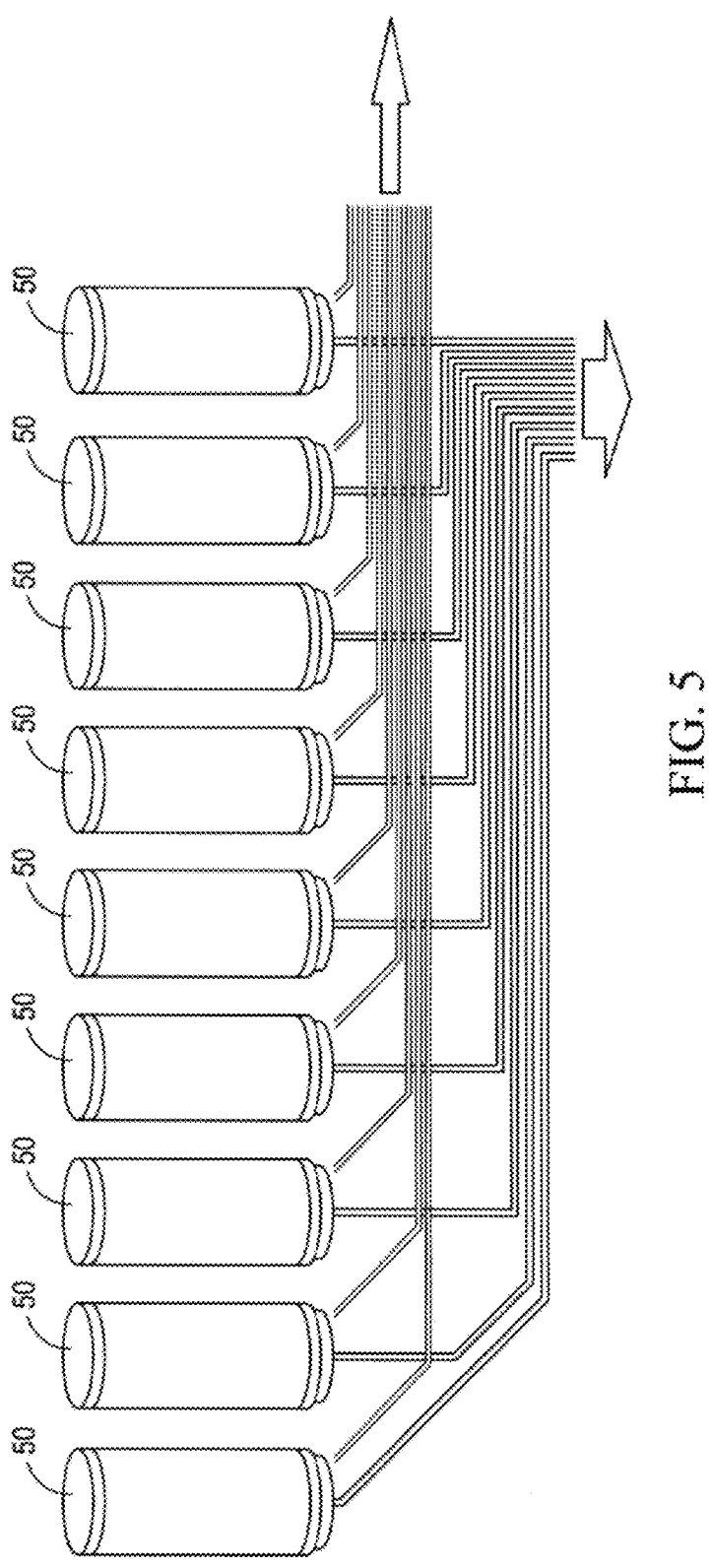
FIG. 5 is a schematic view of gas supply units of the present invention.

Referring to FIGS. 1-6, a plant cultivation system 1 according to the present invention is provided for selection of an optimal plant cultivation process. The system 1 comprises a plurality of water supply units 10, a water treatment unit 20, a plurality of nutrition units 30, a reactor 40, a plurality of gas supply units 50, a liquid storage unit 60, at least three growth boxes 71, 72, 73, and an information device 80.

The plurality of water supply units 10 receive and hold therein a plurality of different water sources, respectively.

The water treatment unit 20 is connected to the plurality of water supply units 10 to carry out treatment on the plurality of different water sources of the plurality of water supply units through various operations, including filtering, purifying, and modifying the water sources in order to supply filtered, purified and modified water.

The plurality of nutrition units 30 receive and hold therein nutrition elements. Each of the plurality of nutrient units 30 supplies the nutrition element held therein to a mixing device 32 through a conveying device 31 connected to the nutrient unit 30. The mixing device 32 is in connection with the water treatment unit 20 to selectively mix the filtered, purified and modified water with the nutrition elements from the nutrient units 30 to make a nutrition solution.

The reactor 40 is in connection with the water treatment unit 20 and is operable to prepare predetermined qualities of nutrition solutions by means of different control actions.

The control actions of the reactor 40 include a mixing function, a mixing speed control function, a temperature control function with heating and cooling operations, an electrical conductivity control and change function, PH control, a particle size control function, a function of automatic feed of solution to a tank section (nutrient solution storage) of an incubator, and may have other functions on user demand.

The plurality of gas supply units 50 receive and hold therein a plurality of kinds of gases, respectively, and supply the gases to the reactor 40 to mix with the filtered, purified and modified water from water treatment unit 20 and the nutrition solution to prepare a nutrition formula for plant roots or stems.

The liquid storage unit 60 is in connection with the reactor 40 and the water treatment unit 20 and stores the nutrition formula and the filtered, purified and modified water.

Each of the at least three growth boxes 71, 72, 73 is structured to accommodate the same kind (or different kinds) of plant and is in connection with the gas supply units 50 and the liquid storage unit 60 to receive the gases, the nutrition formula and the filtered, purified and modified water and includes a plurality of controlling elements and a cultivation unit. The controlling elements are used to control a growth condition of the plant and the cultivation unit is operable to switch selectively among an aeroponic module 741, a drip irrigation module 742, and a hydroponic module 743.

Figure 6:
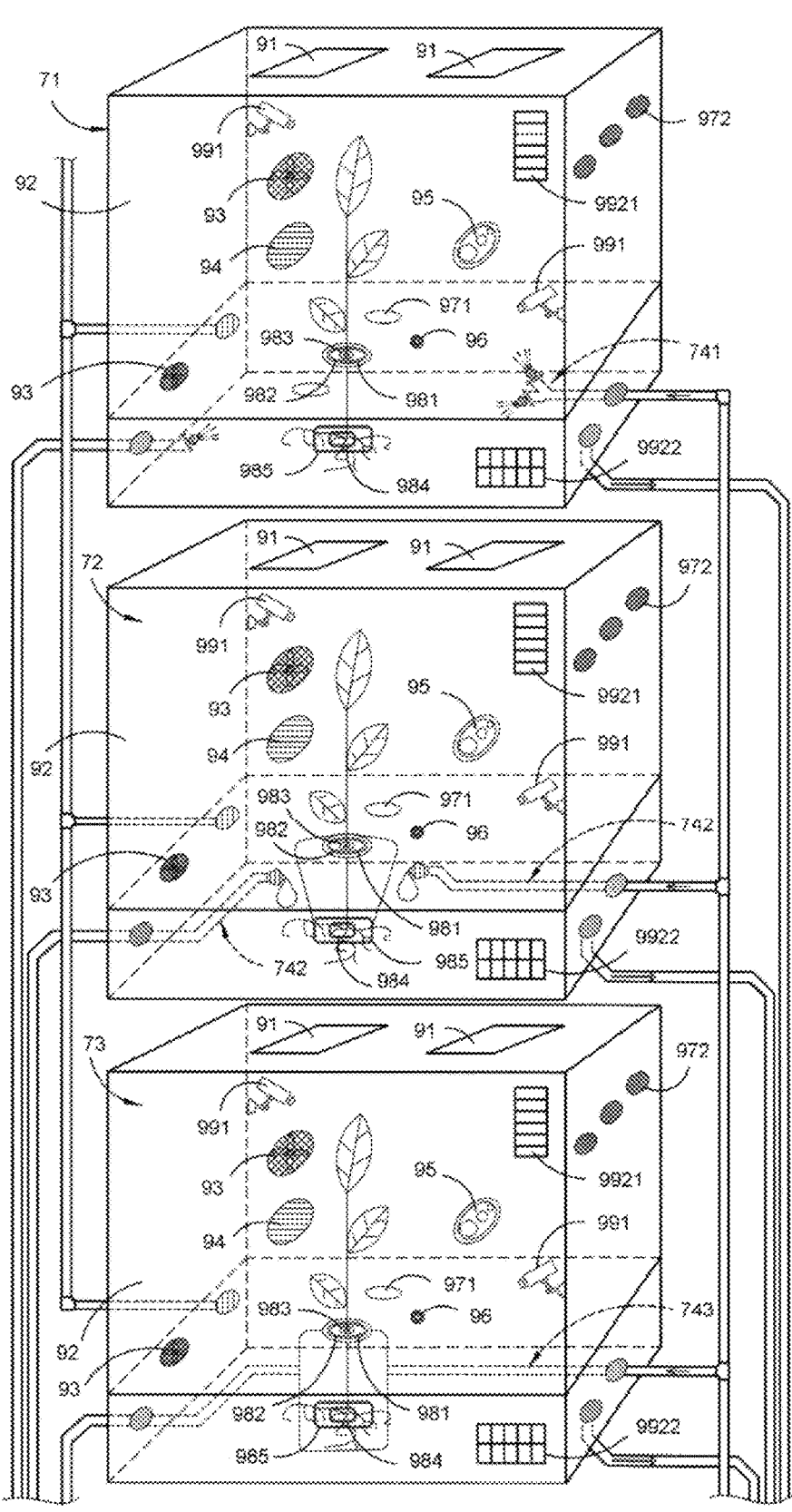
FIG. 6 is a schematic view of growth boxes of the present invention.

In an example shown in FIG. 6, the growth box 71 is switched to an aeroponic module; the growth box 72 is switched to a drip irrigation module 742, and the growth box 73 is switched to a hydroponic module 743. However, a user may selectively switch each of the growth boxes 71, 72, 73 among the aeroponic module 741, the drip irrigation module 742, and the hydroponic module 743 as desired. For example, in a competition of plant cultivation, a user who holds the control of for example the growth box 71 may set, by means of the information device 80 to be further discussed below, the growth box 71 as an aeroponic module 741 in accordance with the provisions of the competition.

The information device 80 is in connection with a servo control unit 81 that is in connection with the reactor 40 by means of wired connection or wireless transmission to control the control actions of the reactor 40 and the operations of the controlling elements of the growth boxes 71, 72, 73 through the servo control unit 81.

In the example shown in FIG. 1, the information device 80 is set in connection with the servo control unit 81 through a network 82, such as the Internet.

The information device 80 may be a notebook computer, a mobile phone, a tablet computer, or the likes.

In an embodiment, the plurality of water supply units 10 comprise five (5) water supply units that respectively receive and hold rainwater, tap water, distilled water, aquaponics system water and other water.

In an embodiment, the water treatment unit 20 includes a plurality of water treatment means 21, such as six (6) water treatment means, in which ozone ($O_3$), water magnetization, ultraviolet (UV) light, electrolysis of water, low frequency sounds, and other possible treatments means are respectively applied to treat water flowing therethrough. Preferably, separate channels are provided to respectively accommodate such treatment means for treating water flowing through such channels. These water treatment means are applied to modify water fed to the water treatment unit 20 and impart various properties, which influence plant growth, to the water to produce modified water. The modified water may then be fed to the main reactor 40 to produce a final solution of the nutrition formula for plants.

In one embodiment, the nutrition elements received and held in the plurality of nutrition units 30 include microelements, macroelements, biologically active additives and bacteria. If desired, nano-elements may be additionally included.

The microelements received and hold in the nutrition units 30 include one or more of Co, Mn, Cu, Fe, Ag, I, Mo, V, Se, Zn, Li, B, Ni, F.

The macroelements received and hold in the nutrition units 30 include one or more of P, Ca, K, C, Mg, Na, and S.

In one embodiment, the plurality of gas supply units 50 include nine (9) gas supply units, which respectively receive and hold therein $CO_2$, $O_2$, $O_3$, $H_2$, NO, $N_2$, $C_2H_4$, $H_2S$ and other kinds of gases.

In one embodiment, the liquid storage unit 60 has at least four containers, which respectively receive and hold therein at least three different nutrition solution formulas and the filtered, purified and modified water supplied from the water treatment unit 20. The at least three different nutrition solution formulas are fed to the three growth boxes 71, 72, 73.

In one embodiment, the controlling elements of each of the growth boxes 71, 72, 73 include a plurality of light sources 91, a light source 92, a plurality of fans 93, an air-conditioning device (a heater and/or a cooler) 94, a speaker 95, a UV light source 96, gas exhaust means 972, gas input means 981, a magnetic ring 982, a stem heater 983, an electric unit 984, and a vibration unit 985. The light source 92 is configured on one side wall of each of the growth boxes 71, 72, 73. The gas input means 981, the magnetic ring 982, the stem heater 983, the electric unit 984, and the vibration unit 985 are arranged close to a plant that grows in each of the growth boxes 71, 72, 73.

The speaker 95 plays music that promotes the growth of a plant inside the growth boxes 71, 72, 73.

The light source 92 is formed of light-emitting diodes (LED) that are selectively set up as sources of infrared light (IR), ultraviolet light (UV) and visible light having adjustable or preset properties, including light intensity, color, wavelength, and the likes.

The magnetic ring 982 is arranged outside and around a stem of a stem inside the growth boxes 71, 72, 73 and may also be arranged around a plant root or leave. In an alternative arrangement, additional magnetic rings may be used for different parts of a plant.

The electric unit 984 supplies an electric current to a plant inside the growth boxes 71, 72, 73.

The vibration unit 985 is operable to vibrate a plant inside the growth boxes 71, 72, 73 in order to stimulate the growth of the plant.

In one embodiment, the growth boxes 71, 72, 73 include a plurality of monitoring units 991 and a plurality of sensors 9921, 9922. The sensor 9921 is arranged to detect a stem of a plant inside the growth boxes 71, 72, 73, and the sensor 9922 detect the roots of the plant. The sensors 9921, 9922 each have a built-in processing unit (CPU) and software, which compares and determines whether data of detection, such as environmental factors of the growth boxes 71, 72, 73 detected by the sensors 9921, 9922 match preset values set up by the user. The CPUs and software of the sensors 9921, 9922 issue a command to start the controlling elements to make the environmental factors inside the growth boxes 71, 72, 73 meet the preset values.

The sensor 9921 may detect chlorophyll, the amount of gas, temperature, humidity, brightness, and the likes.

The sensor 9922 may detect temperature, humidity, ammonia (NH4+), redox value (ORP), nitrate (NO3−), nitrites (NO2−), dissolved oxygen, weight, liquid height detector (level sensor), PH value, turbidity, and the likes.

In one embodiment, the system 1 further includes a filtering unit 993 in connection with the growth boxes 71, 72, 73, the liquid storage unit 60, and the water supply units 10. The filtering unit 993 functions to filter liquid drained out of the growth boxes 71, 72, 73 and the liquid storage unit 60 to provide filtered liquid that flows back to the water supply units 10 for recycling.

In one embodiment, the at least three growth boxes 71, 72, 73 are arranged in a vertical direction for cultivation of short plants.

Figure 7:
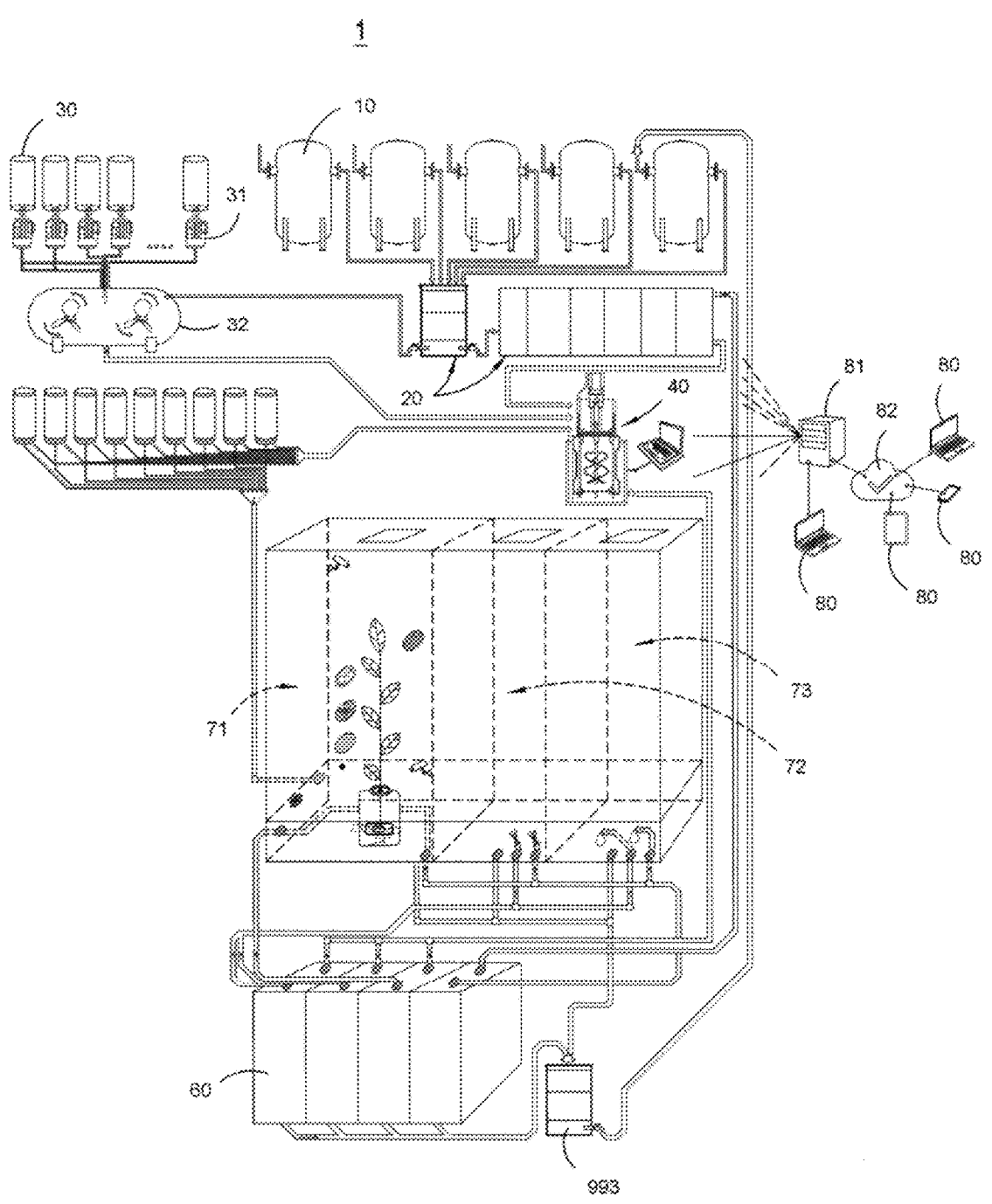
FIG. 7 is a system view of a second preferred embodiment of the present invention.

Referring to FIG. 7, in an alternative example, the at least three growth boxes 71, 72, 73 are arranged in a horizontal direction for cultivation of tall plants.

A method is also provided for selection of an optimal plant cultivation process. The method includes the following steps:

(a) providing a plurality of participants with a cultivation system capable of selecting an optimal cultivation method for carrying out a plant cultivation competition;

(b) establishing the eligibility of the plant cultivation competition;

(c) establishing a growing process in the plant cultivation competition, the growing process being aeroponics, drip irrigation or hydroponics;

(d) establishing types of plants in the plant cultivation competition;

(e) combining the growing processes with the plant types so as to carry out a variety of plant cultivation competitions, in which the participants choose the growing processes and the plant types;

(f) announcing competition starting date and a participant registration period through media, so that all participants finish registration and pay an access fee on the website;

(g) providing all participants with required seedlings and one incubator containing at least three growing boxes 71, 72, 73; allowing the participants to cultivate seedlings with three different conditions or using three different growth formulas at the same time, which gives more chances to succeed;

(h) adjusting and controlling plant growing conditions, growing methods and nutrition formula in the growth boxes 71, 72, 73 by the participants by selecting a plurality of controlling elements, cultivation units and reactor 40 provided by the plant cultivation system 1 of the optimal plant cultivation method;

(i) choosing the best growing box out of three and submitting it to selection committee by participants after the competition finishes, the committee selecting the best growing method and nutrition formula, thereby finding out the best cultivation methods of the plants; and (j) selecting the best plant cultivation method according to the kinds of the plants, and judging and rating the specifications of the kinds of the plants.

Referring to FIG. 7, a participant in any corner of the world may use the information device 80 to connect with the servo control unit 81 in a wired or wireless transmission way so as to control the control action of the reactor 40 and the operation of the controlling elements of the growth boxes 71, 72, 73 through the control software, programs and commands preset by the servo control unit 81.

Accordingly, the present invention may control plant growth factors and nutrient supply of the growth boxes 71, 72, 73 remotely, the remote control being acted at least as the following:

(1) selecting the dosing and mixing of liquid nutrients;

(2) choosing water and water regulation;

(3) choosing the mixing of gas and nutrient;

(4) preparing the final formulation of nutrient liquid in the reactor 40;

(5) controlling the growth factors of plant roots;

(6) controlling the growth factors of plant stems; and (7) archiving and analyzing plant growth process statistical data.

The present invention has the following advantages:

(A) a new platform for remote research, especially for those who cannot conduct their own research and experiments on the growth of plants in required and necessary test conditions;

(B) the participants in every place of the world can operate the same greenhouse facilities together at the same time, and grow the same plant or a several types of plants at the same time, latitude and location. But, every participant themselves may use the facilities provided in the greenhouse to adjust and control other growing conditions, cultivation methods and nutrition formulas, and the best cultivation method and nutrition formula are selected, thereby finding out the best cultivation method of the plant when the competition is over;

(C) people all over the world and even in outer space can use the cultivation facilities of the present invention to study, test the cultivation methods and nutrition formulas of the plants only through internet;

(D) the participants in any place of the world can use the cultivation facilities of the present invention to simulate experimental cultivations such as a variety of temperatures, humidity, soil textures, gases, pHs, sunlight, and then select the one having the best effect among a variety of experimental cultivation methods and formulas, which is used for formal cultivation use in the future so that the participants may only stay at home or a work place to carry out experiments simply through internet with no need of a long journey to specific fields and laboratories and does not have to build laboratories by themselves. In addition, the same plant can be grown by means of a variety of methods at the same time, the experimental cost and time decreased substantially, and uncertain factors (e.g. place-to-place four seasons temperature, temperature and humidity, soil, pH value, air quality difference, sunshine difference) reduced significantly the experiments so carried out can obtain the best cultivation method and nutrition formula for each kind of plant.

(E) the research results can be used immediately on greenhouse agriculture, commercialized directly; the installation of the same facilities all over the world to culture plants will not be restrained and affected by local climate difference.

(F) in traditional cultivation, people need work actually in the field such that they must be strong. But, people with disabilities can even carry out plant cultivation and much more research an optimal plant cultivation methods and formulas only by controlling a computer or mobile device with network.

The present invention further provides a turnkey platform for cybernetic control of plant growth from preparing a growth medium to growing plants through remote control. This functions as "a smart factory for plant growth".

In such a cybernetic control platform, a user may set up numerous conditions for growing plants as desired and receives a finished product with pre-planned characteristics, for examples:

(1) for diabetics: plants with a minimum sugar content;

(2) for patients with hemoglobin deficiency: plants with a high iron content;

(3) for patients with heart diseases: plants with a high content of potassium and magnesium; and (4) for strengthening the immune system: plants with a high content of vitamin C and other vitamins.

In this platform, the content of chemicals and nutrients in a plant and its individual organs may be properly managed so as to turn the plant into biological additives for proper nutrition and health promotion with defined functions.

According to the present invention, the smart plant factory includes two main units, one being a unit for preparation of a growth medium and the other being a plant growing unit, which is a phytotron or a plant incubator. The phytotron or incubator may be referred back to the previous description concerning the growth boxes 71, 72, 73 shown in for example FIG. 1. For such a purpose, the phytotron or incubator may also refer to a growth box or a growing box, of which certain details have been provided above, while additional specifics may be known from the following description.

A more detailed description of the cybernetic control platform will be provided below with reference to FIGS. 8 and 9.

Firstly, the first part of the smart plant factory, namely the unit for preparation of a growth medium for plants, which will also be referred to as a growth medium preparation unit, includes sub-systems for plant growth control factors, including water, water structure, nano-elements, gases, and growth medium parameters.

For the factors of water and water structure, reference is made back to FIG. 1 for the water supply units 10 and the water treatment unit 20. In a preferred embodiment shown in FIG. 8, a water supply module 2010 is provided, and the water supply module comprises multiple water supply units, which are designated at 2012 in FIG. 8, but may be of an arrangement and structure similar to the water supply units 10 presented with the previous embodiment and shown in FIG. 1. Multiple types of water are supplied respectively through the multiple water supply units, such that each of the multiple water supply units provides a separate, predetermined type or source of water, which is fed, as a combined source of water through for example a pipeline sub-system 2011, and is used to prepare the growth medium. Such separate sources of water may include city water (tap water), rainwater with preliminary treatment, distilled water, and water with control of the deuterium content in water 1-150 PPM, or those described above.

The above types of water may be subjected to treatment, such as those carried out in the water treatment unit 20 of FIG. 1 in order to make a desired water structure. In the embodiment shown in FIG. 8, a five channel based water treatment unit 2020 is shown, including five treatment channels 2021 through which water flows to be subjected to different types of water treatment in the channels 2021.

In a preferred embodiment, seven treatment channels are included in the water treatment unit, which are respectively referred to first to seventh channels and will be discussed below. It is noted that the present invention is not limited any specific number for the water treatment channels. For example, the seven treatment channels are arranged as a combination of the five channels shown in FIG. 8 and two extra channels not shown in FIG. 8.

The first channel allows water to be treated with a magnetic field by creating a magnetic field of controlled intensity around for example a tube or a pipe that constitute the channel. Such a tube or pipe will be referred to as a channel tube.

The second channel allows water to be treated with an electric field by creating an electric field of controlled intensity around the channel tubes.

The third channel allows to process water with vibration by using a device that creates a vibration with adjustable parameters.

The fourth channel allows to create cavitation in the water passing through the tube.

The fifth channel allows both heating and water cooling due to an induction heater in the first half of the pipe and a cooler in the second half of the pipe.

The sixth channel allows magnetic treatment of water by passing water through a set of disc magnets.

The seventh channel allows water treatment with ultra-sound of adjustable frequency and intensity.

The platform further includes a nutrition module 2030 that includes a dosing or dispensing system that may include one or more or all of the nutrition units 30 of FIG. 1, or simply constitutes a part of the nutrition unit 30 or may be even an expanded form of the nutrition unit 30. In the embodiment shown in FIG. 8, the nutrition module 2030 comprises ten sources of nutrition 2031. However, this invention is limited to any specific number of sources of nutrition.

The dosing system of the nutrition module 2030 functions to add preset components from the sources of nutrition to water from the combined source of water. The dosing system is operable to select desired nano-, micro- and macro elements in a required amount from 0.001 milliliters. The sizes of nano-, micro-, and macro elements are selected for mixing with water, such as 5, 25, 50, 75, 100, 150, 200, 300, 400, 500. The dosing system of the nutrition module 2030 may include a device as an option for additional components such as amino acids, microorganisms, protective equipment and more. In the embodiment shown in FIG. 8, the sources of nutrition include a supply of elements, in the form of nano-, micro- and macro elements, and optionally a supply of the additional components, to the water.

As a preferred example, the nutrition module 2030 is connected to the pipeline sub-system 2011 at a location downstream of the water treatment module 202, and these sources of nutrition are added into the water after the water is subjected to water treatment carried out in the water treatment module 2020. As shown in FIG. 8, the sources of nutrition 2031 are each connected through a vale 2032 to the pipeline sub-system 2011 downstream of the water treatment module 2020 in order to realize a controlled supply of such nutrition to the treated water.

Various gases may be supplied in this platform. The supply of various gases is referred to back to the gas supply units 50 of FIG. 1. Further details are provided below. Desired types of gases and concentrations are selected and supplied to a reactor sub-system 2040, which will be discussed hereinafter, to be mixed with water. In an embodiment, nine types of gas are selectively supplied. In a preferred alternative, a process of selecting among the nine gases is carried out with software. This is for the safety of working with such gases. In this way, certain restrictions may be imposed on proportion and concentration of each of the gases to be mixed, as this is controlled by software having preset criteria.

The reactor sub-system 2040 includes a reactor 2041 and a mixing unit 2042. The reactor 40 shown in FIG. 1 may be provided in this platform as the reactor of the reactor sub-system 2040 for the purposes of selecting and mixing growth medium ingredients. The mixing unit are operable to carry out a process of mixing water with the nano-components and the gases discussed above. The reactor 2041 is operable to allow a user to select and set time, pressure, temperature, P/H, electrical conductivity. After the preparation of the growth medium, the growth medium, which makes a formula for plant grown and may be in the form of liquid, is automatically fed into a tank, which is located in the lower part of the phytotron or growing box for its further use in growing plants. Details of the phytotron or growing box will be provided below.

In this way, the preparation of the growth medium, or the growth medium itself, show excellent property of repeatability. The formula of this growth medium as a recipe for plant nutrition may be stored in the archive. Further, the user has the opportunity to automatically create a variety of nutrient solution formulas for a variety of plant nutrition recipes.

Figure 8:
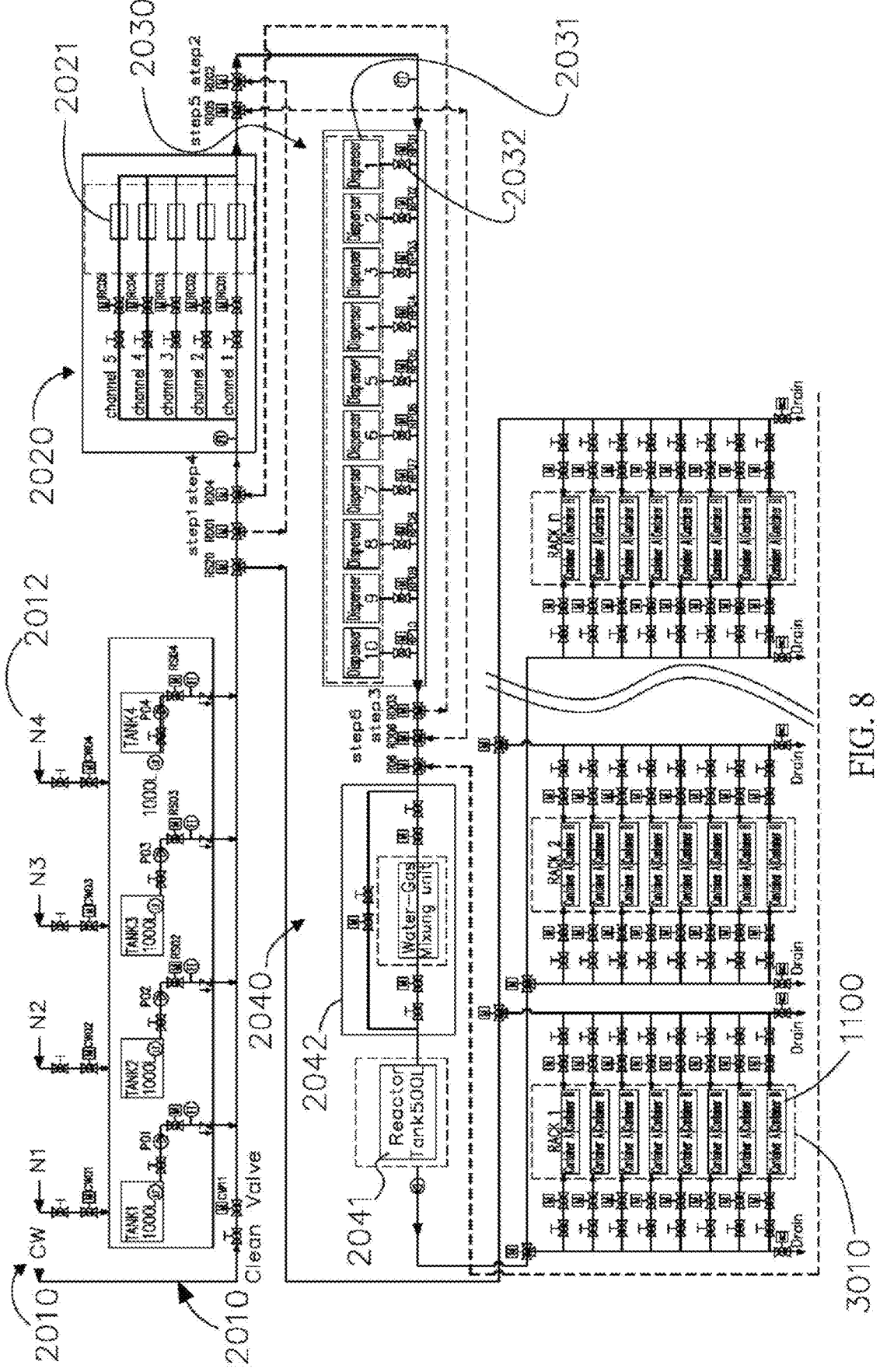
FIG. 8 is a schematic view showing a plant growing system that functions as a smart plant factory according to a different embodiment of the present invention.

As an alternative example, FIG. 8 provides an illustration of an arrangement for the system, which is different from what shown in FIG. 1, yet constructed of similar components.

The second part of the smart plant factory, namely the phytotron or the incubator or the growth box, a group of multiple growth boxes (or simply the boxes) may be used. In the example shown in FIG. 8, multiple growth boxes are arranged on multiple racks 3010. Each of the racks 3010 carries a number of the growth boxes 1100 that are connected to the pipeline sub-system 2011 in order to receive the water that is fed out of the reactor sub-system 2040.

The growth boxes 1100 are included in this platform for growing plants and, as noted in the previous examples, the growth boxes are divided into two types, one for short plants and the other for tall plants.

For easy illustration, only one of the growth boxes or phytotrons will be described as an example, and the remaining ones, if any, would be structured in a similar form having a similar arrangement, with or without minor modifications.

Figure 9:
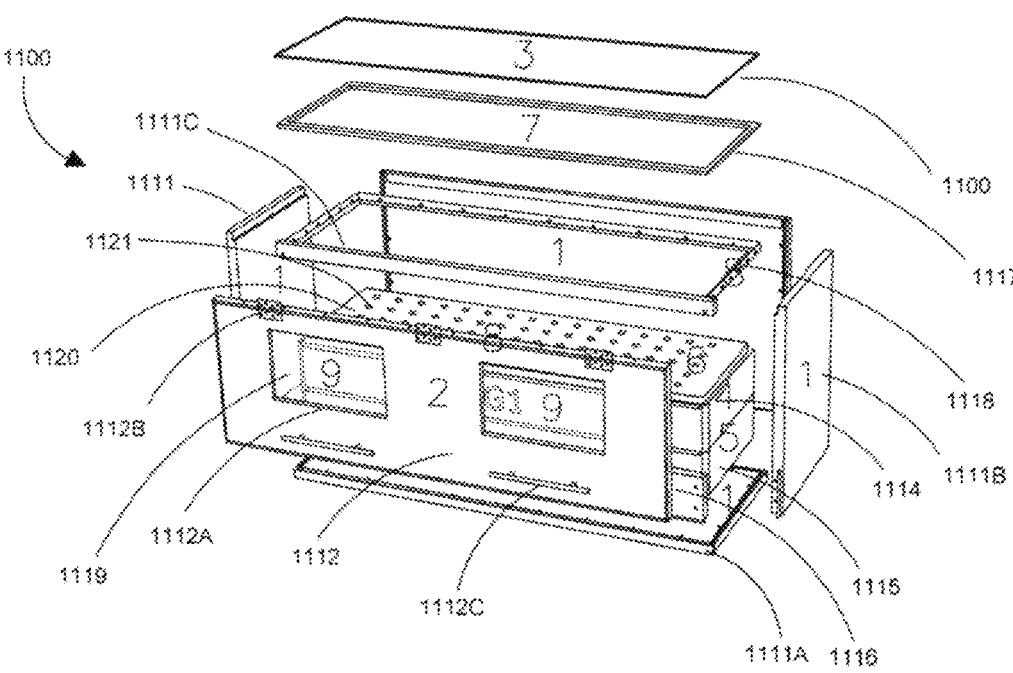
FIG. 9 is an exploded view showing a growing box, which functions as a phytotron for growing one or more plants therein, incorporated in the plant growing system according the present invention, wherein a one-piece plant plate is used to hold plants in the growing box.
Figure 14:
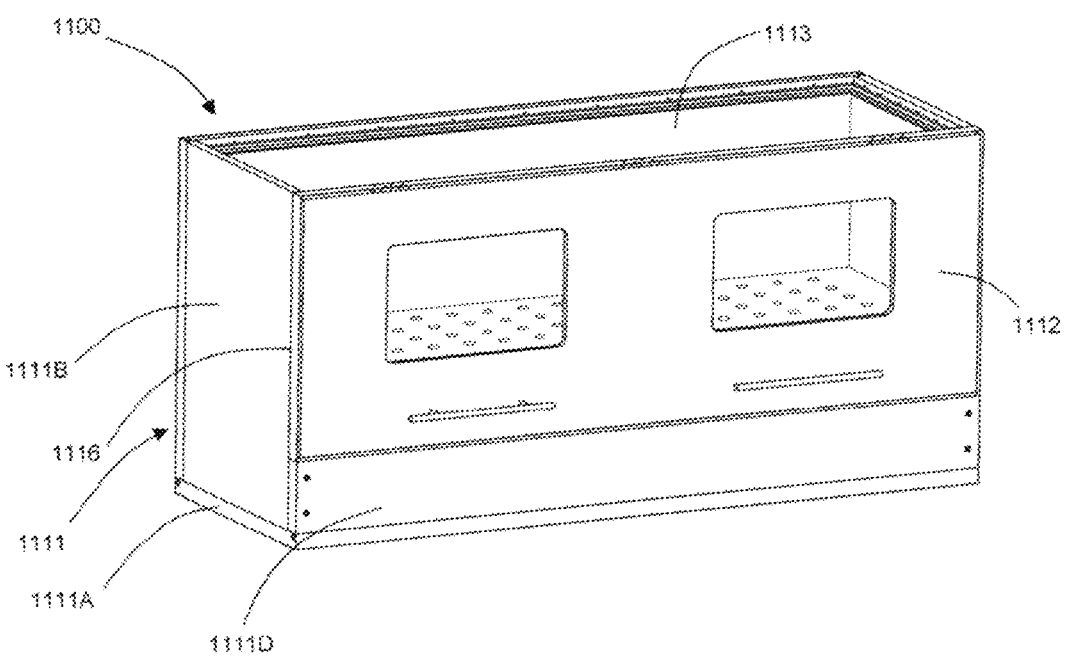
FIG. 14 is a perspective view showing the growing box of a modified form according to the present invention, the growing box being shown in a closed condition.
Figure 15:
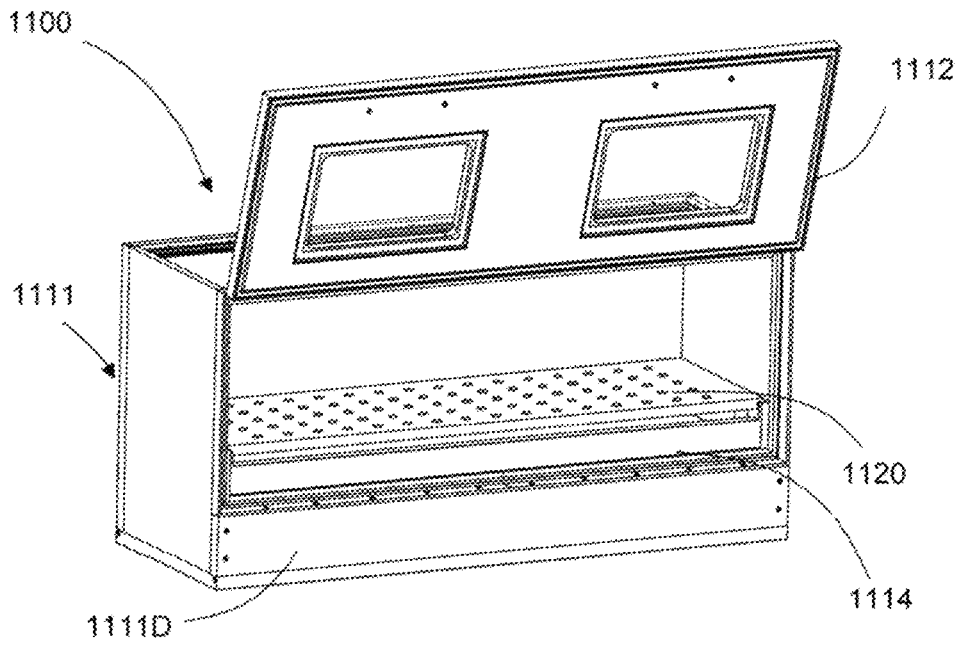
FIG. 15 is a perspective view, similar to FIG. 14, but showing the growing box in an opened condition.

FIG. 9 provides an example of the box, which is generally designated at 1100, of which a perspective view showing the box 1100 in an assembled form is provided in FIGS. 14 and 15, respectively illustrating a closed condition and an open condition.

The box 1100 includes two tanks, an upper tank 1114 and a lower tank 1115 (also see FIG. 11) located on a lower part of an interior space thereof and supported by a base or bottom 1111A. The upper tank 1114 is preferably stacked atop the lower tank 1115, see FIG. 11. A clearer view of each of the two tanks 1114, 1115 is provided in FIG. 12. For illustration only, the lower tank 1115 is provided in FIG. 12; however, the upper tank 1114 may just has a similar structure. In an alternative arrangement, the upper tank 1114 and the lower tank 1115 are integrally formed as a one-piece structure, and interior spaces of the lower tank and the upper tank are continuous from each other to define a single, enlarged interior space for the combination of the upper and lower tanks.

Figure 12:
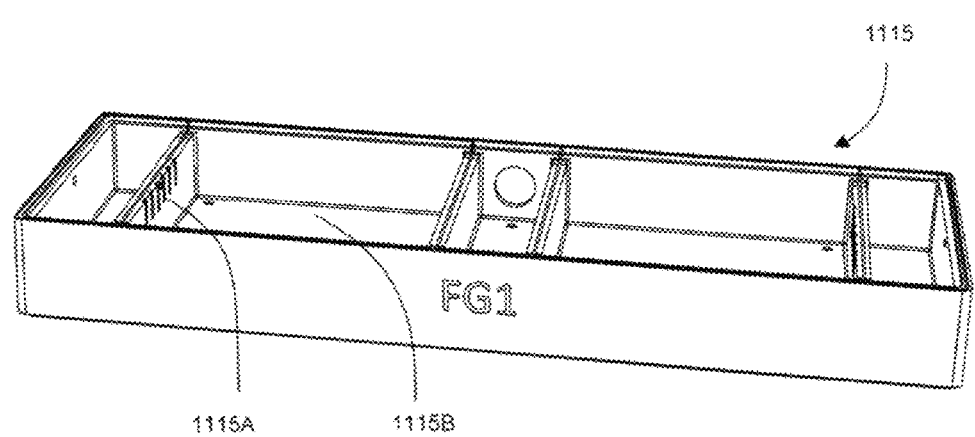
FIG. 12 is a perspective view showing the lower tank of the growing box of the plant growing system.

The lower tank 1115 has an interior space, which is preferably divided by partitions 1115A into multiple compartments 1115B having therein a void space, see FIG. 12, for receiving and storing therein two or more types of growth media, clean water, equipment for cooling and box control controller (not shown) in such spaces.

The upper tank 1114 may similarly have an interior space, but selectively and preferably not divided into separate compartments, which is for growing the root part of plants (not shown). However, if desired, the upper tank 1114 may be optionally provided with compartments 1114A to define separate compartments 1114B, as provided in an alternative example shown in FIG. 13.

The two tanks 1114, 1115 occupy the lower part of the box 1100 and supported on the base or bottom 1111A of the box 1100. The box 1100 also has a void space in an upper part thereof that is above the two tanks 1114, 1115. The void space of the upper part of the box 1100 is intended for the growth of a stem part of a plant or multiple plants.

The box 1100 and the two tanks 1114, 1115 are made of a foam material in order to maintain a stable temperature in the interior space of the box and the tanks.

As noted above, the two tanks 1114, 1115 have similar configurations. The difference is 0 only in the absence of partitions 1115B in the upper tank 1102 for the growth of the root part of the plants. This configuration provides an easy way for the nutrient solution to circulate between the lower and upper tanks 1114, 1115 with minimum of energy for raising water. This configuration allows to maintain the temperature of the nutrient solution.

Referring back to FIG. 9, the box 1100 comprises nine main parts, which will be separately described below.

The box 1100 includes a box body 1111, as a first main part, defining a closed or sealed chamber or container. The box body 1111 includes the base or bottom 1111A. The base or bottom 1111A is made of a heat-insulating material. In the example illustrated, the box body 1111 has a front opening for access of the interior thereof.

The box 1100 includes, as a second main part, a box door 1112 that is made of a heat-insulating material and has one or more transparent inner windows 1112A for visual observation of the interior of the box 1100. Two such windows 1112A are provided in the example, and are preferably openings formed in the box door 1112. The box door 1112 is preferably made openable, such as mounted to the box body 1111 or an additional component, such as an aluminum profile 1116 (to be described hereinafter) combined with the box body 1111 by means of hinges 1112B, so that the box door 1112 is openable, through rotation relative to the box body 1111, or closable to close the front opening of the box body 1111.

The box door 1112 may be provided, on a front surface thereof, with a handle 1112C for hand holding to open the box door 1112.

The box body 1111 also has a top that forms an opening and a top transparent plate 1113, preferably a glass plate, which is the third part of the box 1100, is set on a top of the box body 1111 and cover and close the top opening of the box body 1111. The top glass plate 1113 that is set at the top of the box body 1111 of the box 1100 is made of highly diffuse glass with a vacuum interlayer (not shown). A glass plate with a vacuum interlayer is commonly known and no further detail will be necessary.

The upper tank 1114, which is a fourth main part of the box 1100, is made of a foamed insulating material and, as noted above, may be provided, as an example, for accommodating the root part of the plant.

The lower tank 1115, which is a fifth main part of the box 1100, is also made of a foamed insulating material and as noted above, may be provided for accommodating the plant growth medium.

The aluminum profile 1116, which, as a sixth main part of the box 1100, includes or in combined with corner parts, is arranged as a frame that is combined with the box body 1111 to cover the front opening of the box body and to receive the box door 1112 to be hinged thereto.

In addition, as a seventh main part of the box 1110, a rubber pad 1117 is provided under the glass plate 1113 and is supported between the glass plate 1113 and the top of the box body 1111 to ensure air tightness of the box 1100 at the top thereof.

As an eight main part, an aluminum corner 1118 that is in the form of a frame is mounted to the top opening of the box body 1111 for supporting the glass plate 1113 at the top of the box 1100. The rubber pad 1117 is interposed between the glass plate 1113 and the aluminum corner 1118 to provide air-tight engagement therebetween.

It is noted that although both the aluminum profile 1116 and the aluminum corner 1118 are described as being made of "aluminum", the materials that can be used to make the profile 1116 and the corner 1118 are not limited to aluminum. Any material that provides sufficient strength for the purposes that the profile 1116 and the corner 1118 should serve could be used to made the profile 1116 and the corner 1118.

Each of the openings 1112A of the box door 1112 is covered with a transparent plate 1119, which is a ninth main part of the box 1100. In the example illustrated, the transparent plate 1119 is made of transparent acrylic. Other materials, such as glass, may also be used for such a transparent plate 1119.

Figure 10:
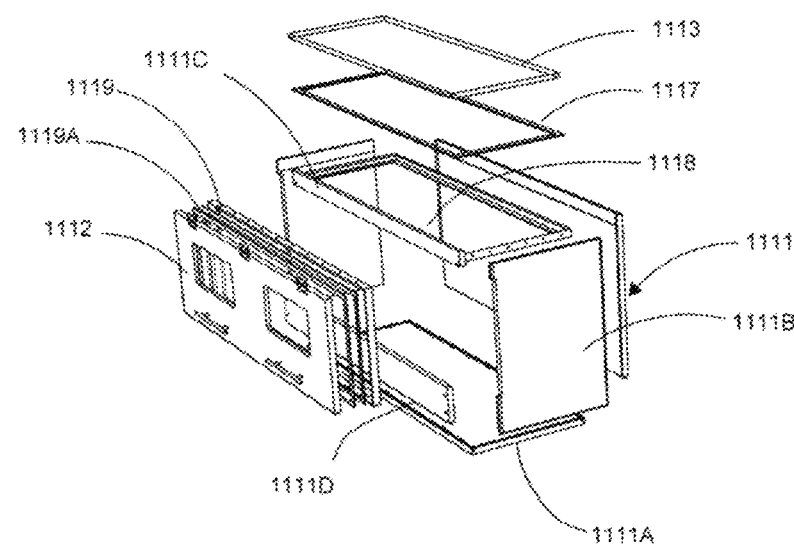
FIG. 10 is an exploded view of the growing box taken from a different angle, with upper and lower tanks and a plant plate removed for simplification.

As shown in FIG. 10, the transparent plate 1119 is of a size that corresponds to the box door 1112 and is attached to an inner side of the box door 1112 with one or more sealing gaskets 1119A interposed therebetween.

It is noted that the upper tank 1114 and the lower tank 1115 are removed from FIG. 10 for simplifying the illustration.

In the example illustrated, in addition to the base or bottom 1111A, the box body 1111 also includes multiple sidewalls 1111B that are connected to each other and to the base or bottom 1111A to define the front opening and the top opening of the box body 1111.

The sidewalls 111B are preferably provided with a step in each of the sidewalls 111B at a location close to the top opening of the box body 1111 in order to support the corner 1118 thereon.

A top connection member 1111C is provided to span between upper ends of two opposite ones of the sidewalls 1111B of the box body 1111 in order to provide as a covering for the corner 118, preferably being attached to the corner 1118, or may be selectively connected to the two sidewalls 111B to provide a desired structural strength or to provide for easy mounting of the hinges 1112B of the box door 1112.

A bottom connection member 1111D (also see FIG. 10) is provided to connect between, as spanning between, lower ends of the two opposite sidewalls 1111B of the box body 1111 in order to provide a desired structural strength for box door 1112, or other purposes.

It is noted, as provided in an alternative example shown in FIGS. 14 and 15, the top connection member 1111C may be omitted, while the bottom connection member 1111D is preserved for structural strength.

In the example shown in FIG. 9, a plant plate 1120 is provided atop the upper tank 1114. The plant plate 11120 is formed with an array of openings 1121, preferably arranged an array including multiple rows and multiple columns. The plant plate 1120 may be made in one piece, as shown in FIG. 9, having a size sufficiently to cover the top of the upper tank 1114. Or, alternatively, two separate plant plates 1120A, also formed with the openings 1121, are provided to collectively cover the top of the upper tank 1114. In other words, each of the plant plates 1120A covers a part of the top of the upper tank 1114, and a combination of the two plant plates 1120A, as being arranged side by side, would sufficient to cover the top of the upper tank 1114. This arrangement allows each of two plant plates 1120A to be removed individually to expose the interior space of the upper tank 1114.

The openings 1121 are arranged to extend, preferably in a direction perpendicular to a surface of the plant plate 1120, 1120A, completely through the plant plate 1120, 1120A, to each support one plant therein with a root of the plant (not shown) extending in to the interior space of the upper tank 1114 in which the nutrition solution is held, so that the root may absorb the nutrition from the solution held in the upper tank 1114.

Figure 13:
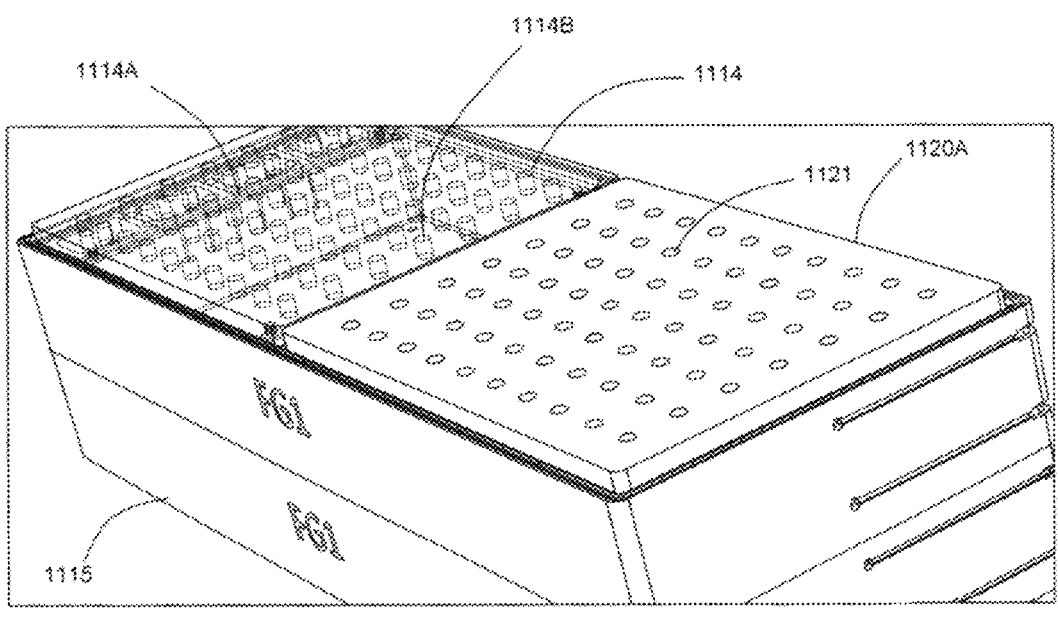
FIG. 13 is perspective view showing the stack of upper and lower tanks taken from a different angle, one of the two plant plates being shown in a see-through manner to illustrate inside details of the upper tank, in which at least one partition is mounted to divide an interior space of the upper tank into multiple compartments.

A clearer view showing the opening 1121 extending completely through the plant plate 1120, 1120A is provided in FIG. 13.

Figure 11:
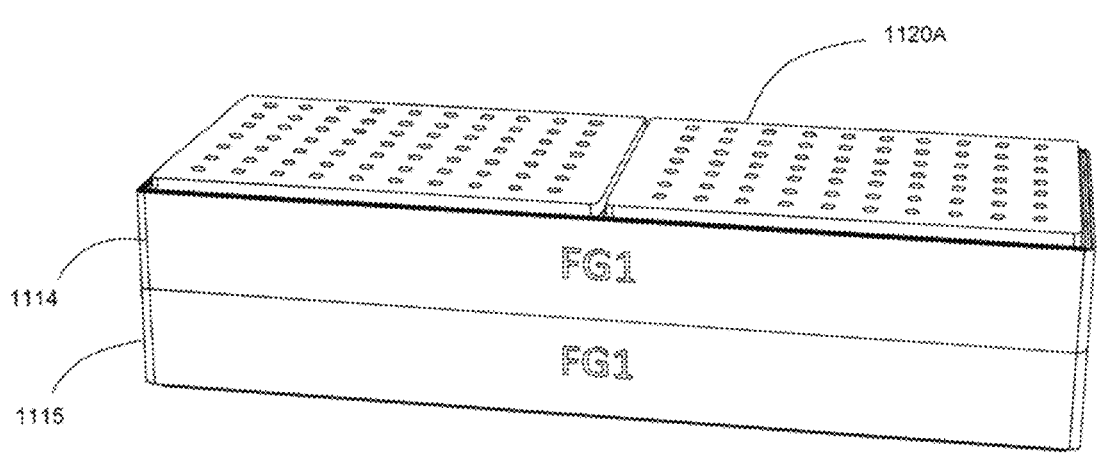
FIG. 11 is a perspective view showing the upper and lower tanks of the growing box of the plant growing system according to the present invention, the tanks being arranged in a stacked form, a modified example of two separate plant plates arranged side by side being disposed atop the stack.

Referring to FIGS. 11-13, the upper tank 1114 and the lower tank 1115 are preferably of the same size having the same height, the same width, and the same length, as each being of a parallelepiped configuration and, preferably and as shown, being a rectangular cuboid.

Figure 16:
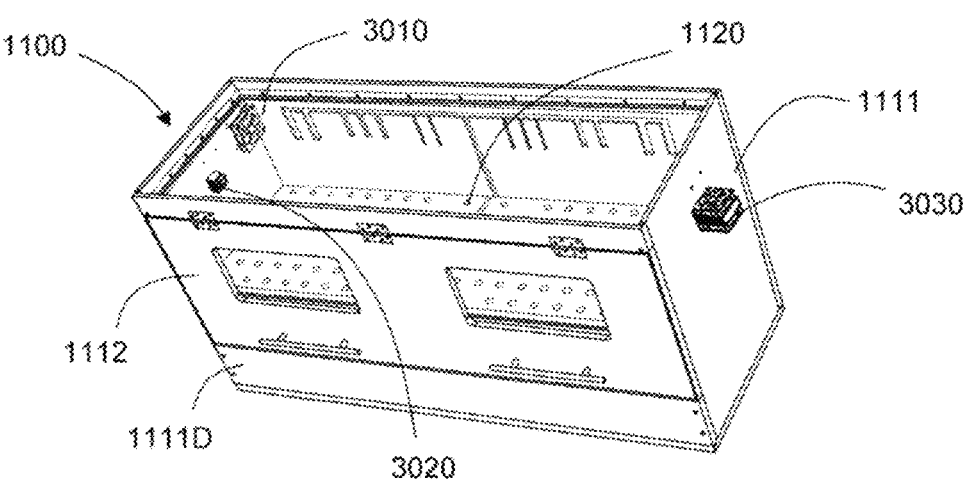
FIG. 16 is a perspective view showing an additional form of the growing box according to the present invention, with the glass plate and the corner removed from the top of the box body for illustration of the inside details, various devices, including a fan, an LED light, and a ventilator, being mounted to sidewalls of the box body.

Further, as shown in FIGS. 9, 15, and 16, the upper part of the box 1100, which is a void space for accommodating stems of plants, has a height selected for plant growth, and such a height of the upper part of the box 11100 is preferably equal to the sum of the heights of the two tanks 1114, 1115.

As noted above with reference to the previous embodiments, the plant growth box can be of two types, one being a tall box and the other being a short box.

In a further example shown in FIG. 16, various operation devices and/or sensors are provided in the box body 1111 and preferably mounted at suitable locations, such as the sidewalls 1111B. In the example illustrated in FIG. 16, a fan 3010, an LED light 3020, and a ventilator 3030, are mounted to sidewalls 1111B of the box body 1111. It is appreciated that other devices and/or sensors as those described with reference to the previous embodiment and FIG. 6 may be selectively incorporated in the growing box 1100, if desired.

For a short box, which is provided for growing short plants, as described above, the height of the upper part of the box 1100 is the same as the combined height of the upper and lower tanks 1114, 1115.

For a tall box, which is provided for growing tall plants or plants requiring additional space, the height of the upper part of the box 1100 can be as large as five times the combined height of the two tanks 1114, 1115. However, no specific constraint is made for the height of the upper part of the box 1100, whether it is a short box or a tall box.

Similar to the examples of growth boxes 71, 72, 73 provided in for example FIG. 6, the box or phytotrons 1100, whether a short one or a tall one, can be provided with sensors and equipment, of which an example is shown in FIG. 16, for the purpose of or additionally incorporating measures for automatic remote control.

In a way similar to what disclosed in FIGS. 6 and 7, the box or phytotron 1100 of the smart plant factory incorporate automatically control plant growth factors that enable settings of different parameters for plant growth. Details are provided below. It is noted that certain details can be found in the previous embodiment shown in FIGS. 1-7.

In a specific example, the electric unit 984 arranged in each of the growth boxes 71, 72, 73 comprises a voltage control unit 9840 that is in electrical connection with, or alternatively, electrically and mechanically included in, the servo control unit 81. The electric unit 984 further comprises two electrodes of opposite polarities, which are respectively in the form of a negative wire 9841 and a positive wire 9842 in FIG. 17. In the example shown in FIGS. 9-16, the growth box, which is designated at 1100 and may serve as the growth box 71, 72, 73 shown in FIG. 6, is of a two layered structure including the upper tank 1114 and the lower tank 1115, and for the two layered structure of the growth box 1100, the two wires 9841, 9842 are arranged inside the growth box to serve as the two electrodes that are electrically connected to the voltage control unit 9840, and in the example, the two wires 9841, 9842 are arranged on a bottom of the lower tank 1115 of the growth box. The two wires 9841, 9842 are electrically and respectively connected to a negative terminal and a positive terminal of the voltage control unit 9840 to receive electricity therefrom so as to establish a potential difference between the two wires 9841, 9842 by which electric simulation is applicable to a plant or multiple plants growing in the growth box. FIG. 6 provides a schematic form of the electric unit 984 applying electric stimulation to the plant in each of the growth boxes 71, 72, 73, while specifics of the arrangement of the electric unit 984 is shown in FIG. 17.

In an alternative arrangement in which the upper and lower tanks are integrated as a one-piece structure, which will be referred to as a single-floor tank, the two wires 9841, 9842 can be simply disposed on a bottom of the single-floor tank.

Figure 17:
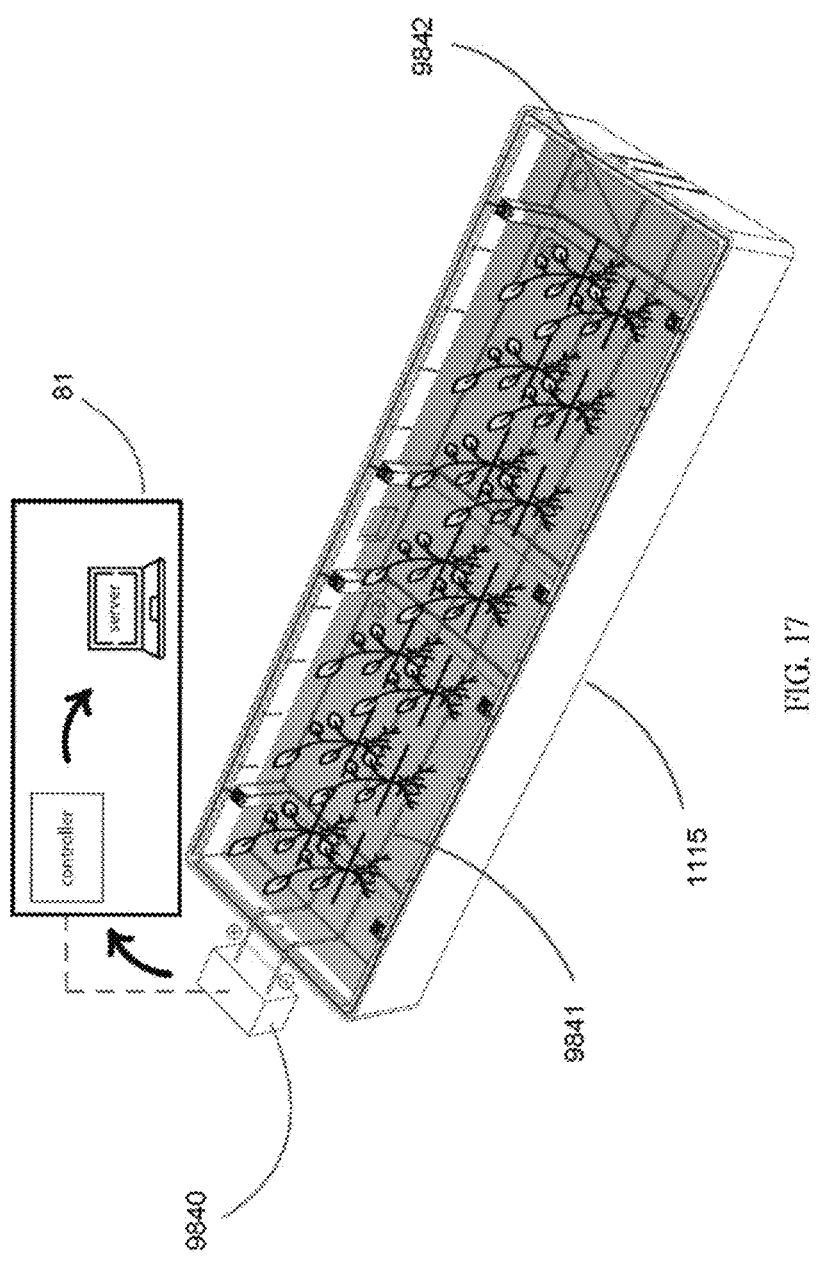
FIG. 17 is a schematic view showing an illustrative example of an arrangement of a tank according to the present invention, including details of an electric uni.
Figure 18:
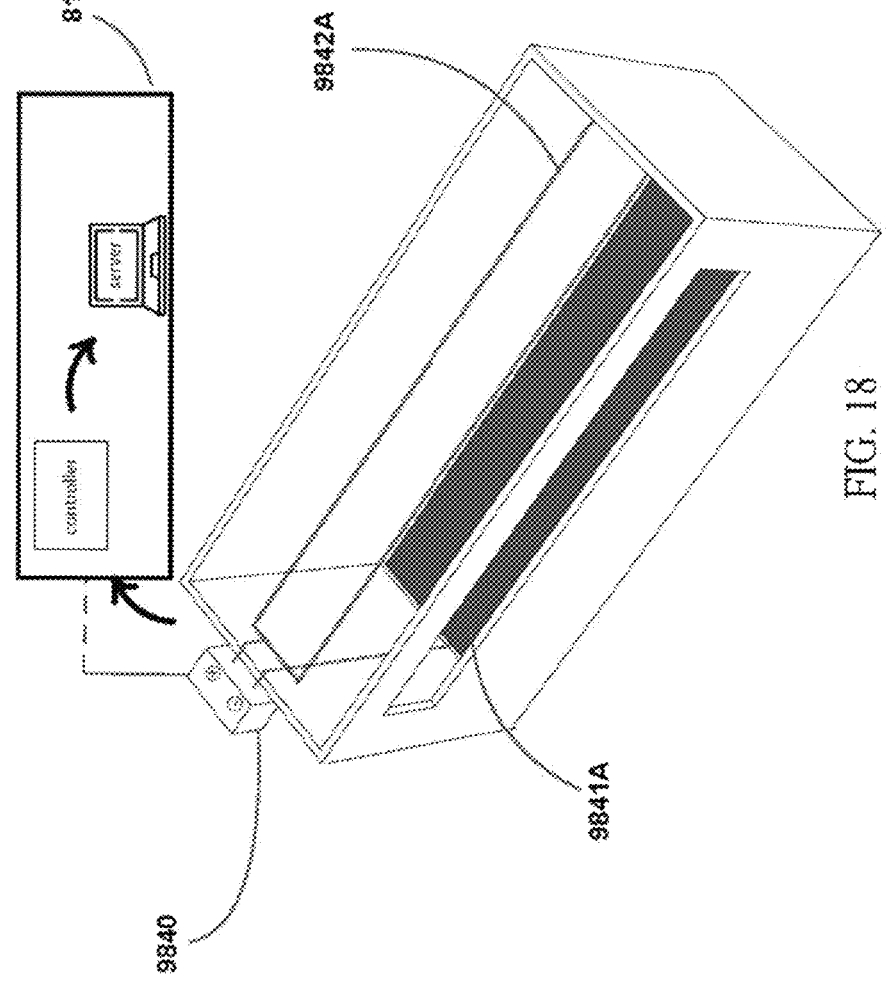
FIG. 18 is a schematic view showing an alternative example of an arrangement of a tank according to the present invention, including details of an electric uni.

In the example of FIG. 17, the two wires 9841, 9842 that serve as two electrodes of opposite polarities are arranged, generally, parallel to each other and located on the bottom of the lower tank 1115 (or alternatively, on the bottom of the single-floor tank) and spaced from each other in a horizontal direction, considering the growth box is placed on a horizontal surface. In an alternative form, as shown in FIG. 18, the two electrodes, which are designated as 9841A, 9842A, are arranged to space from each other in a vertical direction. The negative electrode 9841A is in the form of a plate that is electrically connected to a negative terminal of the voltage control unit 9840 and is positioned on the bottom of the growth box (such as the bottom of the lower tank of the growth box) and preferably matches in size and shape to the bottom of the growth box. The positive electrode 9842A can be in the form of a wire, or multiple wires, which are spaced from the plate of the negative electrode 9841A in the vertical direction, and the positive electrode 9842A can be located in the lower tank of the growth box, or if desired, the positive electrode 9842A can be arranged in the upper tank of the growth box. In an alternative arrangement in which the upper and lower tanks are integrated as a single-floor tank, the positive electrode 9842A is arranged in an upper portion of the single-floor tank, while the negative electrode 9841A is arranged in a lower portion of the single-floor tank.

In FIG. 18, the positive electrode 9842A comprises two wires that are generally parallel to each other and on a same horizontal plane, in a manner of being spaced from each other horizontally, and are both connected to a positive terminal of the voltage control unit 9840. Similarly, electricity supplied from the voltage control unit 9840 establishes a potential difference between the two electrodes 9841A, 9842A for electric simulation to a plant or multiple plants growing in the growth box.

The voltage control unit 9840 is connected to and controllable by the servo control unit 81 that in turn receives instructions from or feeds data back to the information device 80, so that the servo control unit 81 may carry out a preset control procedure preloaded therein to cause the voltage control unit 9804 to supply electricity in a predetermined form in respect of multiple electric and/or chronical parameters to the two electrodes 9841, 9842 (or 9841A, 9842A) to implement electric stimulation to the plant(s). It is noted that a separate controller may be arranged between the voltage control unit and the servo control unit, or as depicted in the drawings, the controller may be combined with, and thus serving as a part of, the servo control unit.

In a further embodiment, an air humidifier, designated at 750 in FIG. 19, may be provided in the growth box to construct for example an aeroponic module 741 arranged in the growth box 71 shown in FIG. 6. The aeroponic module 741 is shown in a schematic form in FIG. 16, and specifics of the air humidifier, which is applicable as a part of the aeroponic module 741, are shown in FIG. 19, also in a schematic form. It is noted that such an air humidifier can also be applicable to other growth modules, such as the drip irrigation module 742 and the hydroponic module 742 mentioned previously, and other growth modules or arrangements that are known in the art, to provide a desired level of humid or mist in the atmosphere in which the plants are growing. Further details will be provided below.

Figures 20, 20A:
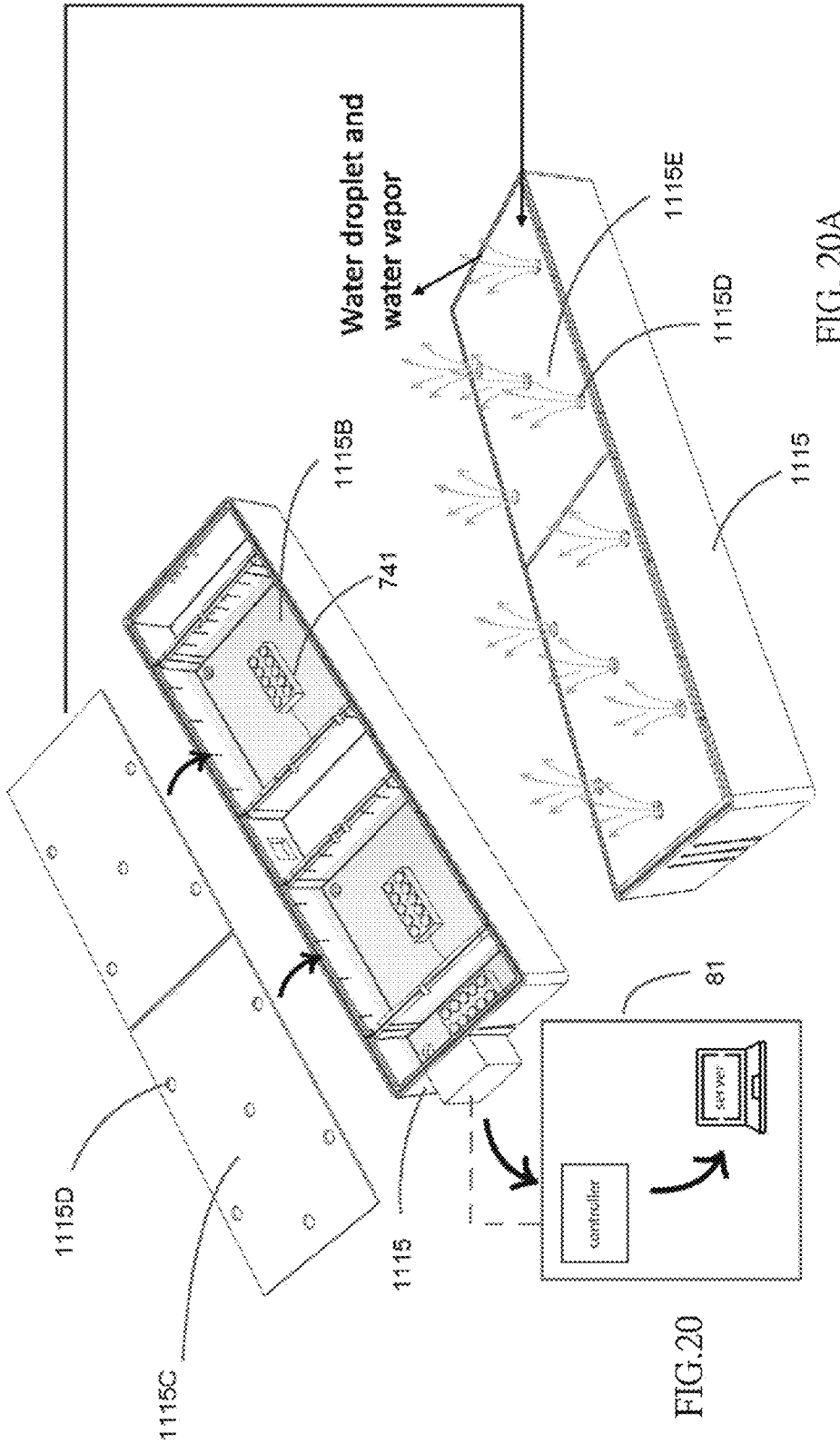
FIG. 20 is a schematic view showing a humidification system arranged in a tank of the growth box according to the present invention, a cover plate being detached from the tank.
FIG. 20A is a schematic view showing the growth box of FIG. 20 in an assembled form.

The air humidifier 750 according to the present invention comprises an ultrasonic transducer 751, of which a perspective view is shown in FIG. 19A. The ultrasonic transducer 751 is electrically connected by electrical wires 751A to an electrical power source (not shown in FIGS. 19 and 19A), which can be a separate device operable independently or connected to and controllable by the servo controller unit 81, or can be combined with (or as a part of) and controlled by the servo controller unit 81. The ultrasonic transducer 751 is placeable in a water tank 752, which can be the lower tank 1115 (or a single-floor tank) of the growth box as shown in FIG. 20. The water tank (or lower tank 1115) is filled with water such that the ultrasonic transducer 751 is submerged in water. The ultrasonic transducer 751 is operable, upon energized, to generate water droplets and water vapor from the water in which the ultrasonic transducer 751 is placed. The water droplets or water vapor so generated is conducted to a space above the water tank, and for example the water vapor is generated by the ultrasonic transducer 751 placed in the lower tank of a growth box and is conducted into the upper tank of the growth box. Details are shown in FIG. 20 that will be described.

FIG. 20 shows an example of an arrangement of the air humidifier 750 that serves as a humidification system in the growth box, specifically in the lower tank 1115 (or a single-floor tank) of the growth box, for generation and supply of water droplets or water vapor into the growth box. FIG. 20A shows a perspective view of the lower tank 1115 (or a single-floor tank) of FIG. 20 in an assembled form. In FIGS. 20 and 20A, the lower tank 1115 takes the form shown in FIG. 12, in which the interior space of the lower tank 1115 is divided by partitions 1115A into multiple compartments 1115B, in at least some of which water, which can be supplied from the water treatment unit 20 or from the reactor 40, see FIG. 1, is filled. In the example of FIG. 20, three of the compartments 1115B is filled with water, and three sets of the air humidifier 750 are respectively arranged in the three compartments 1115B. A cover plate 1115C, which can be a single board or a combination of two or more separate boards, is placed atop the lower tank 1115. The cover plate 1115C is formed with multiple openings 1115D, such as through holes, through which water droplets or water vapor generated by the air humidifiers 751 can be directed into the upper tank (not shown in FIG. 20). FIG. 20A shows the cover plate 1115C assembled on the lower tank 1115, and also shows a jet of water droplets or vapor emitting from each of the openings 1115D.

It is noted that although not explicitly described herein, it is readily appreciated that in the case of a single-floor tank, in which the lower tank 1115 and the upper tank 1114 are integrated as a one-piece structure, the cover plate 1115C can be omitted. Or alternatively, the plant plate 1120 shown in FIG. 9, or 1120A shown in FIG. 11, which is arranged atop the upper tank 1114, can be formed with additional openings through which the water droplets or water vapor may be released into the interior space of the growth box above the upper tank 1114 (or a single-floor tank). The air humidifiers 751 are electrically connected to and controlled by the servo control unit 81. It is noted that a separate controller may be arranged between the air humidifiers and the servo control unit, or as depicted in the drawings, the controller may be combined with, and thus serving as a part of, the servo control unit.

Figure 21:
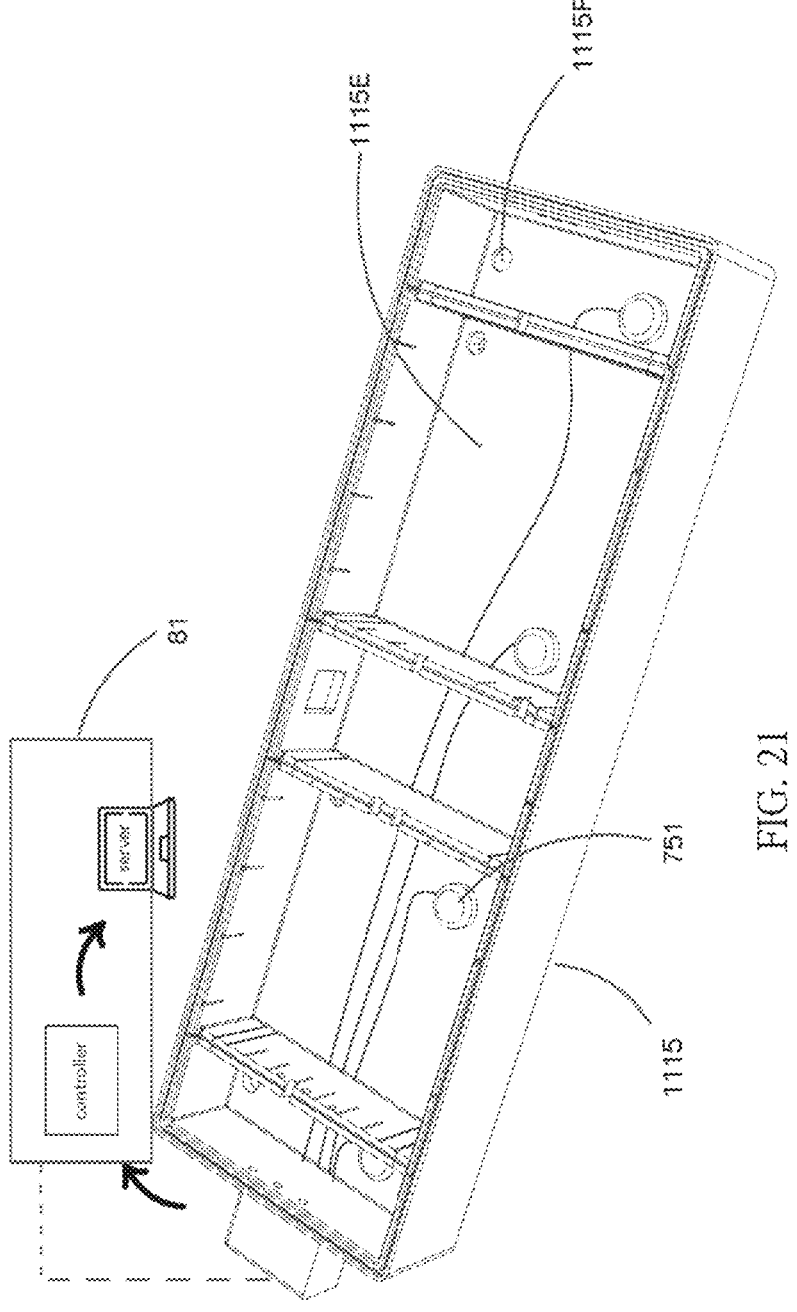
FIG. 21 is a schematic view showing an alternative arrangement of an air humidifier integrated with a tank according to the present invention.

In an alternative arrangement as shown in FIG. 21, the air humidifiers are embedded in a bottom of the lower tank 1115 (or a single-floor tank) and are each partly exposed to release water droplets or vapor into the lower tank and also the upper tank, or openings 1115F may be formed to release water droplets or vapor into the lower tank. In this arrangement, a separation board 1115E may be mounted inside the lower tank 1115 to shield and embed the air humidifiers 751 in the bottom of the lower tank 1115. Means (not shown) is arranged to supply water to the air humidifiers 751 embedded in the bottom of the lower tank 1115.

Figure 22:
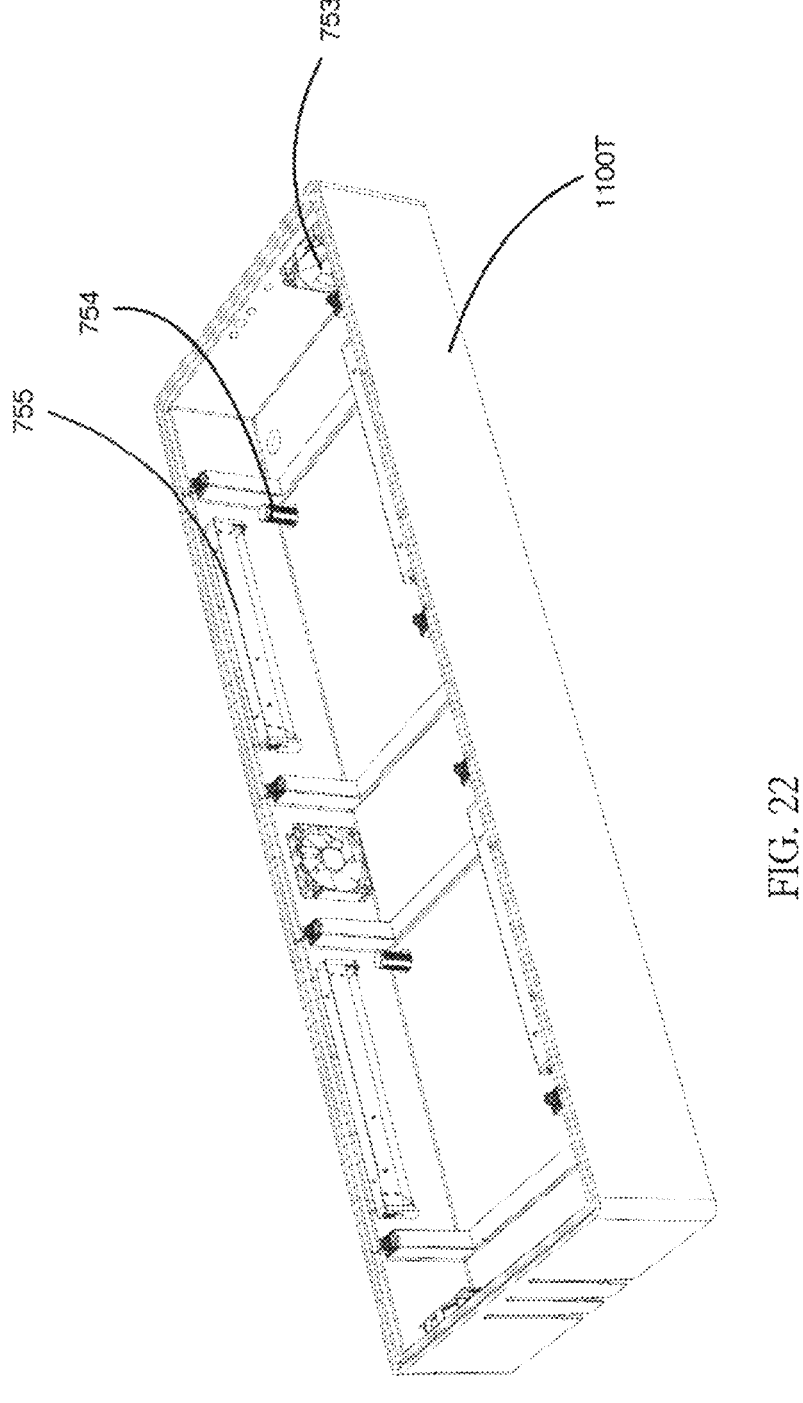
FIG. 22 is a schematic view showing a different arrangement of an air humidification in a tank according to the present invention.

In an alternative embodiment shown in FIG. 22, the humidification system is arranged in the lower tank or the single-floor tank of the growth box.

For easy illustration, the combination of the upper and lower tanks, which are separate, or the single-floor tank will be also referred to as the "tank" for simplicity of description and will be designated at 1100T, which may refer to the lower tank in a combination separate upper and lower tank, or simply the single-floor tank.

The humidification system in the embodiment of FIG. 22 is arranged in the tank 1100T and includes at least one fan 753 to drive air circulation inside the tank 11100T and/or the growth box. In the example shown in FIG. 22, three fans 753 are included, respectively arranged on three sidewalls of the tank 1100T. Various arrangements rather than what shown in FIG. 22 may be adopted for installation of the fans 753. The fans 753 can be that serve as the fans 93 in the growth box 71, 72, 73 shown in FIG. 6, or they can be fans other than those shown in FIG. 6.

The humidification system may include one or multiple filters 754 for removing impurities or contaminants from the circulating air with which the vapor or water droplets may entrain.

In an alternative form, one or multiple ultraviolet (UV) light sources 755 are mounted on the sidewalls of the tank 1100T. In the example, four UV light sources 755 are arranged in pairs that are respectively mounted to two opposite ones of the sidewalls of the tank 1100T. The UV light sources 755 can serve as the UV light sources 96 shown in the example of FIG. 6, or they can be different from the UV light sources 96 of FIG. 6.

Figure 23:
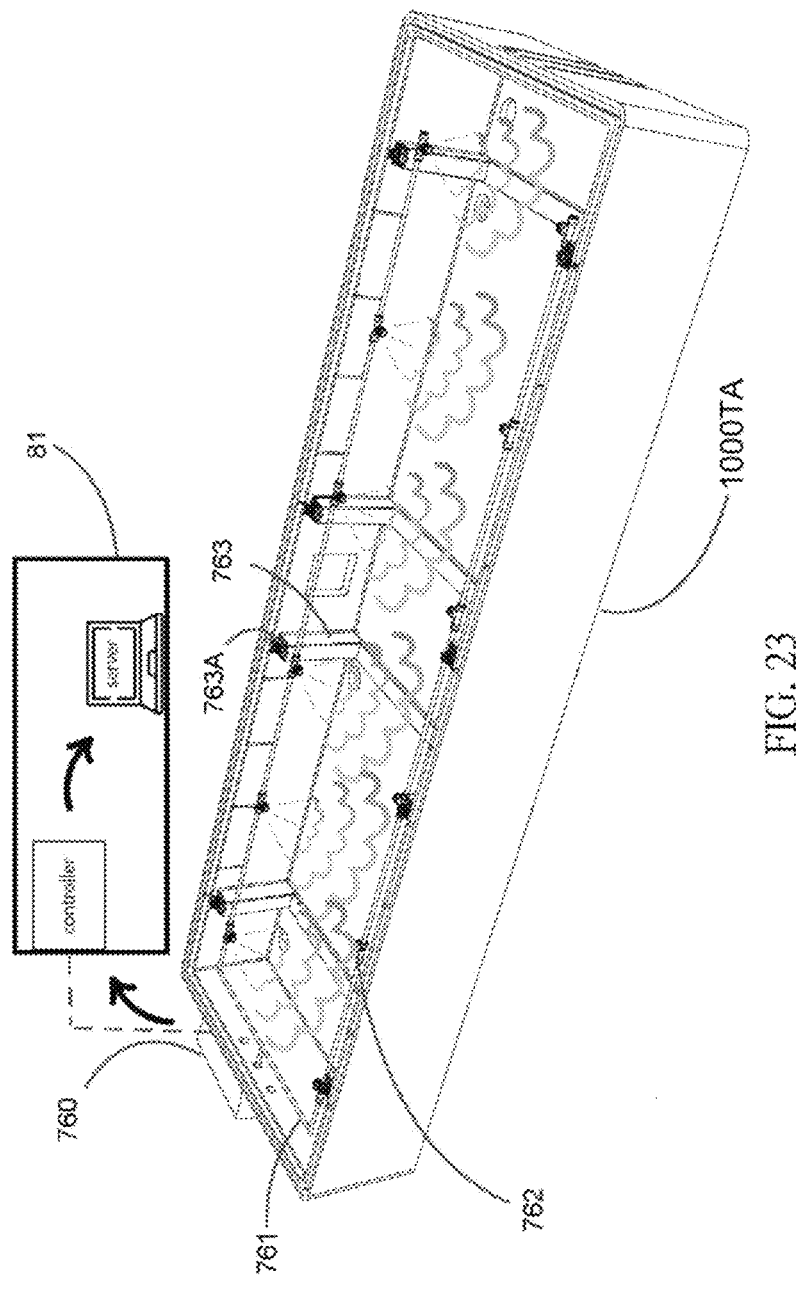
FIG. 23 is a schematic view showing an alternative arrangement of the tank that serves as an aeroponic system according to the present invention.

FIG. 23 shows an alternative form of the tank, which will be designated at 1100TA to serve as an aeroponic system similar to or as an alternative to the aeroponic module 741 shown in FIG. 6. A pump 760 connected to and controllable by the servo controller unit 81 is connected to a water droplets/vapor source, which can be a built-in water droplets/vapor source, such as the air humidifier 750 shown in FIG. 19 embedded in for example the bottom of the tank 1100TA, or a separate water droplets/vapor source that is disposed external of the tank 1100TA, so as to conduct and drive a flow of the water droplets/vapor through pipes 761 arranged inside and around the interior space of the tank 1100TA and including sprayers 762 to jet the flow of water droplets/vapor into the interior space of the tank 1100TA. In the example, sprayers 762 are arranged on two opposite sidewalls of the tank 1100TA.

The tank 1100TA for aeroponic module may include the plant plate 1120 that is mounted atop the tank 1100TA and includes the openings 1121 each of which holds and supports one plant such that the roots of the plant are allowed to extend into the interior space of the tank 1100TA to receive the water droplets/vapor for irrigation. In this regard, pegs or pillars 763 are arranged in the tank 1100TA, preferably mounted to the sidewalls, to define top supporting ends 763A on which the plant plate 1120 may be positioned to be supported atop the tank 1100TA.

It is appreciated that if desired, water droplets/vapor from the same or different sources may also be supplied to the space above the plant plate or the tank 1100TA for contacting and irrigating the leaves of the plants.

Figure 24:
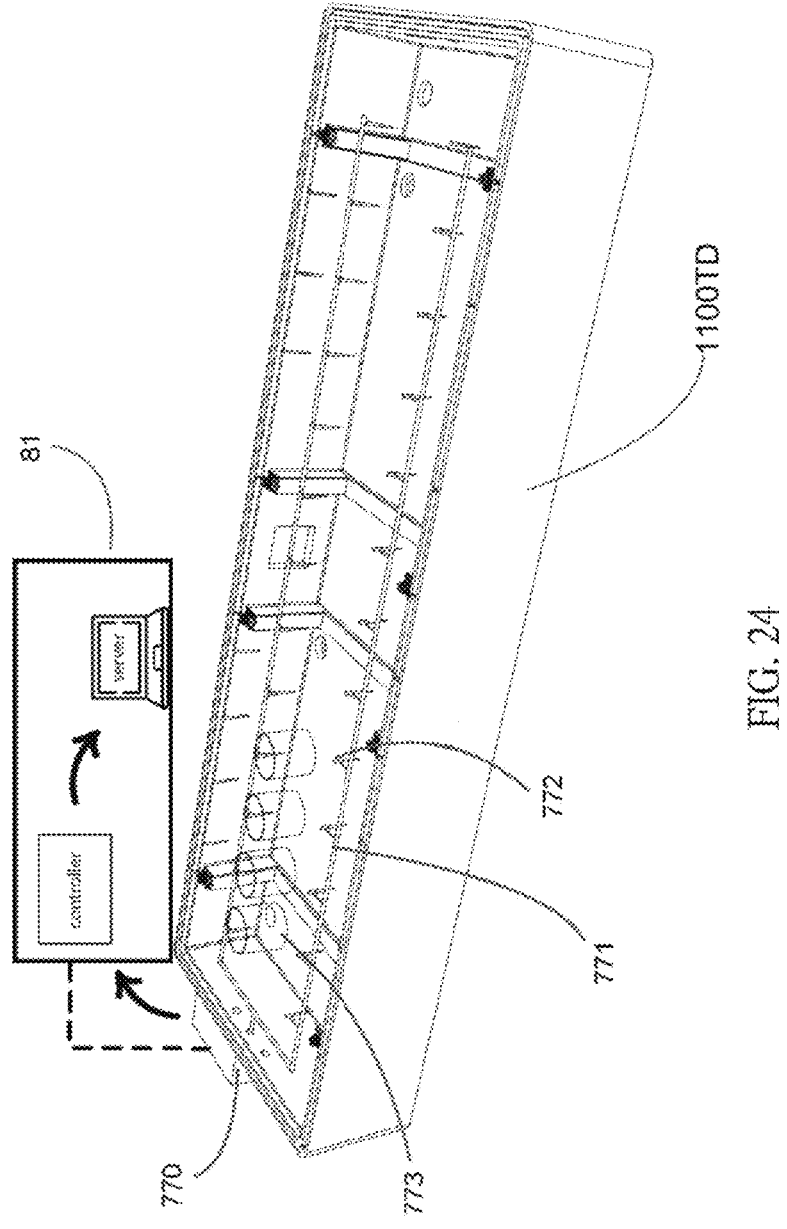
FIG. 24 is a schematic view showing an alternative arrangement of the tank that serves as a drip irrigation system according to the present invention.

In an alternative embodiment, as shown in FIG. 24, a drip irrigation system, which is similar to or as an alternative to the drip irrigation module 742 shown in FIG. 6, is arranged in the tank, which will be referred to as tank 1100TD for distinction. A pump 770 that is connected to and controllable by the servo controller unit 81 to drive and supply water, which can be fed from the water treatment unit 20, or a nutrition solution, which can be fed from the reactor 40, to pipes 771 arranged inside and around the interior space of the tank 1100TD and including nozzles 772 to dispense drips of water or nutrition solution toward one of plants growing in the tank 1100TD. The plants may be grown in pots 773 receive in the interior of the tank 1100TD or a confined area inside the tank 1100TD, and the drips of water or nutrition solution is dispensed into the pots or the confined areas in which the plants are grown.

Figure 25:
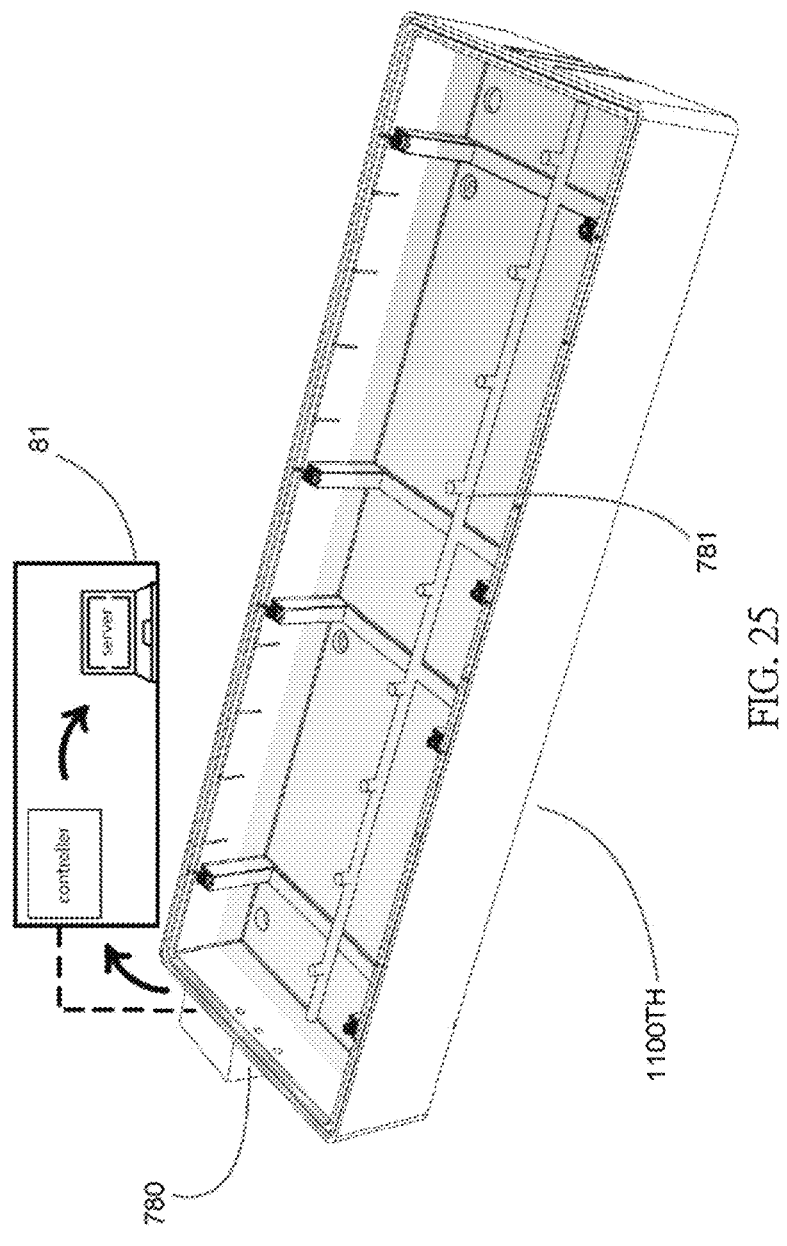
FIG. 25 is a schematic view showing an alternative arrangement of the tank that serves as a hydroponic system according to the present invention.

In a further alternative embodiment, as shown in FIG. 25, a hydroponic system, which is similar to or as an alternative to the hydroponic module 743 shown in FIG. 6, is arranged in the tank, which will be referred to as tank 1100TH for distinction. A pump 780 is connected to and controllable by the servo controller unit 81 and is also connected to a pipeline system 781 for supplying water, which can be fed from the water treatment unit 20, or a nutrition solution, which can be fed from the reactor 40, into the interior space of the tank 1100TH or for draining water or nutrition solution from the tank 1100TH. The plants may be supported on the plant plate 1120 shown in FIG. 9 and placed atop the tank 1100TH, so that roots of the plants may extend into the water or nutrition solution contained int the tank 1100TH.

Figure 26:
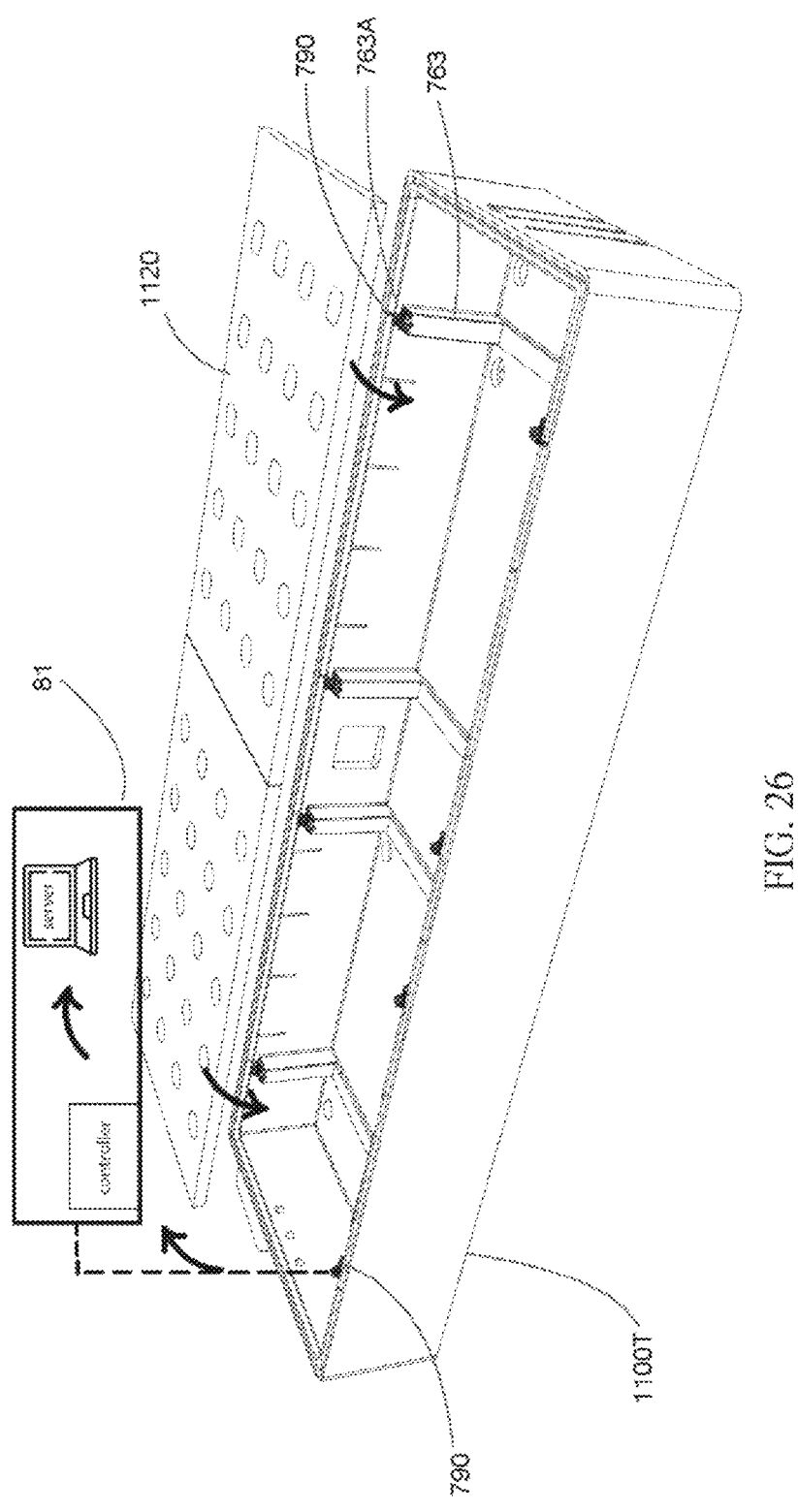
FIG. 26 is a schematic view showing an alternative arrangement of the tank that includes a weighing system according to the present invention.

In a preferred embodiment, a weighing system is included in the tank 1100T. As shown in FIG. 26, the weighing system includes at least one weight sensor 790. In the example shown, multiple weight sensors 790 are included, and are respectively set on the top supporting ends 763A of the pillars 763, on which the plant plate 1120 is positionable so that the weight of the plant plate 1120 together with the plants supported thereon can be measured. As the plant plate 1120 is of a fixed weight, and thus through chronical successive measurements of the weight of the plant plate 1120 in combination with the plants, the growth of the plants may be monitored. The weight sensors 790 are connected to the servo control unit 81 to feed data toward and receive instructions from the servo control unit 81.

In alternative embodiments, temperature regulation means, such as a cooling system (FIG. 27) and a heating system (FIG. 28), is included in the tank 1100T. The temperature regulation means can be the air-conditioning device 94 that includes a heater and/or a cooler as shown in FIG. 6, or the temperature regulation means is a part of the air-conditioning device, or alternatively, a separate temperature controlling device that is different from the air-conditioning device 94.

Figure 27:
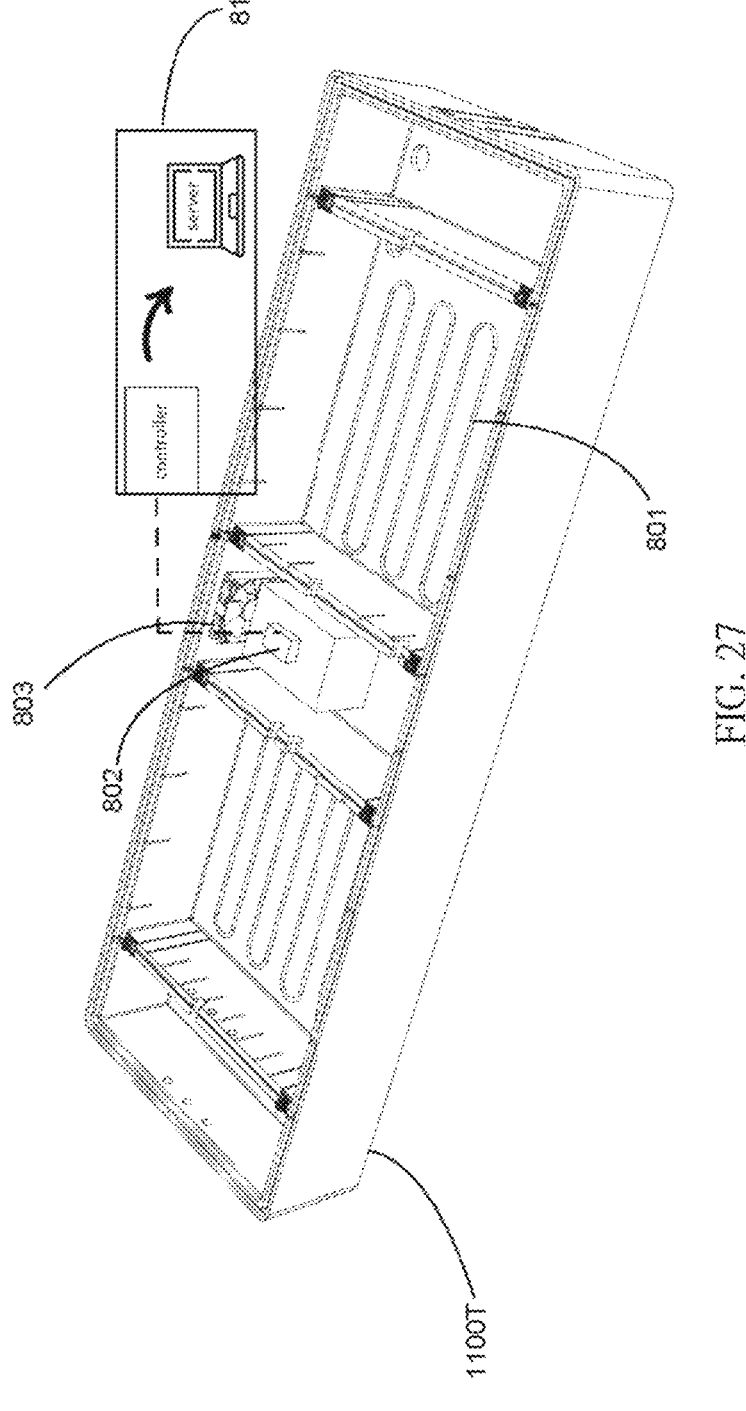
FIG. 27 is a schematic view showing an alternative arrangement of the tank that includes a cooling system according to the present invention.

In the example of FIG. 27, a cooling system is included in the tank 1100T. The cooling system includes at least one chiller coil 801 arranged in one of multiple compartments inside the tank 1100T. The arrangement of multiple compartments is similar to that shown in FIG. 12, and repeated description will be omitted herein. In the example, two sets of chiller coil 801 are respectively set up in two of the compartments. A chiller device 802, which can be a Peltier device, which is operable for thermoelectric cooling through the so called Peltier effect, is arranged to cool down a coolant flowing through the chiller coil 801 in order to reduce a temperature inside the compartment in which the chiller coil 801 is arranged. A fan 803, which may be combined with a valve, is provided to conduct airflow into and out of the tank 1100T for maintaining proper operation of the chiller device 802. The chiller device 802 is connected to and controllable by the servo control unit 81.

Figure 28:
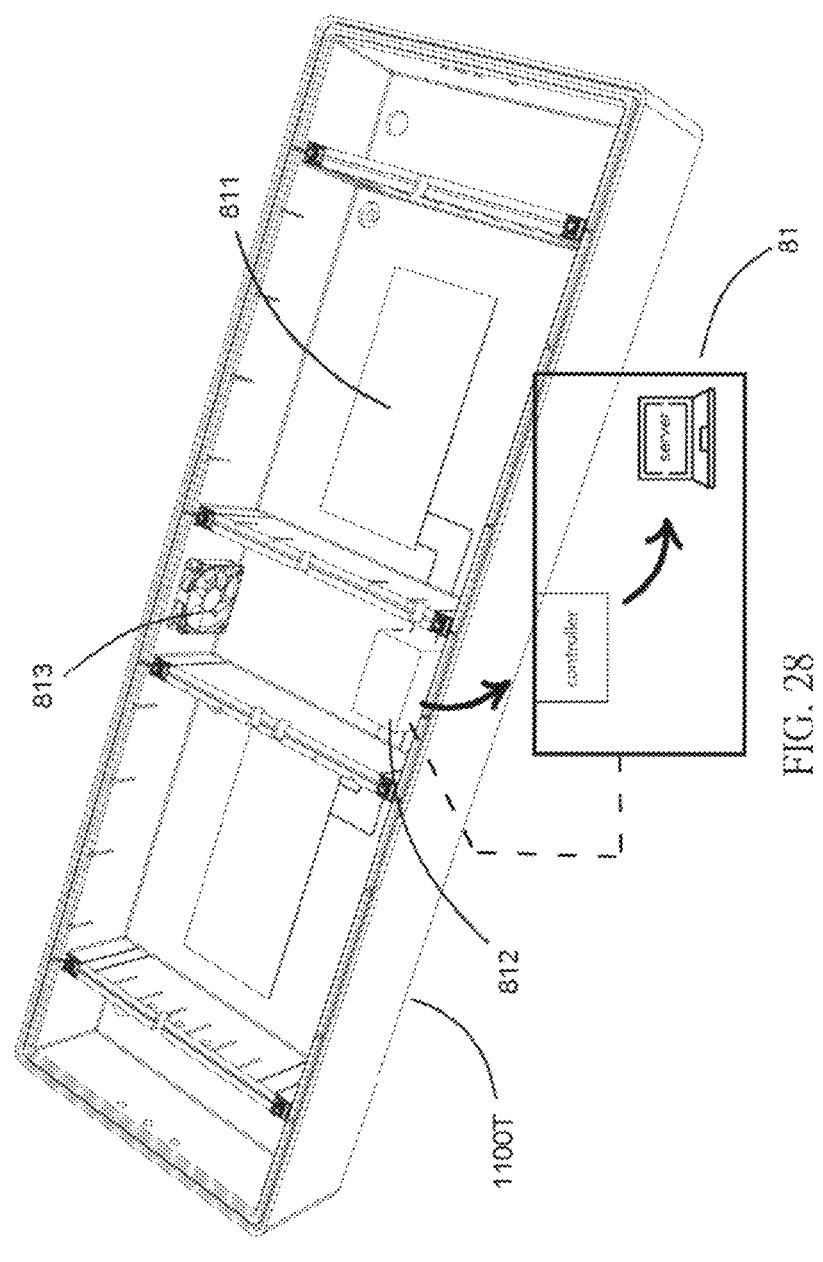
FIG. 28 is a schematic view showing an alternative arrangement of the tank that includes a heating system according to the present invention.

In the example of FIG. 28, a heating member 811, which is preferably in the form of a plate or a film placed on the bottom of one of the compartments of the tank 1100T. In the example, two heating members 811 are respectively set up in two of the compartments. A heating control unit 812 is connected to the two heating members 811 to control operation thereof, and the heating control unit 812 is electrically connected to the servo control unit 81 to be controlled thereby. If desired, a fan 813, which may be combined with a valve, is provided to conduct airflow into and out of the tank 1100T.

Figure 29:
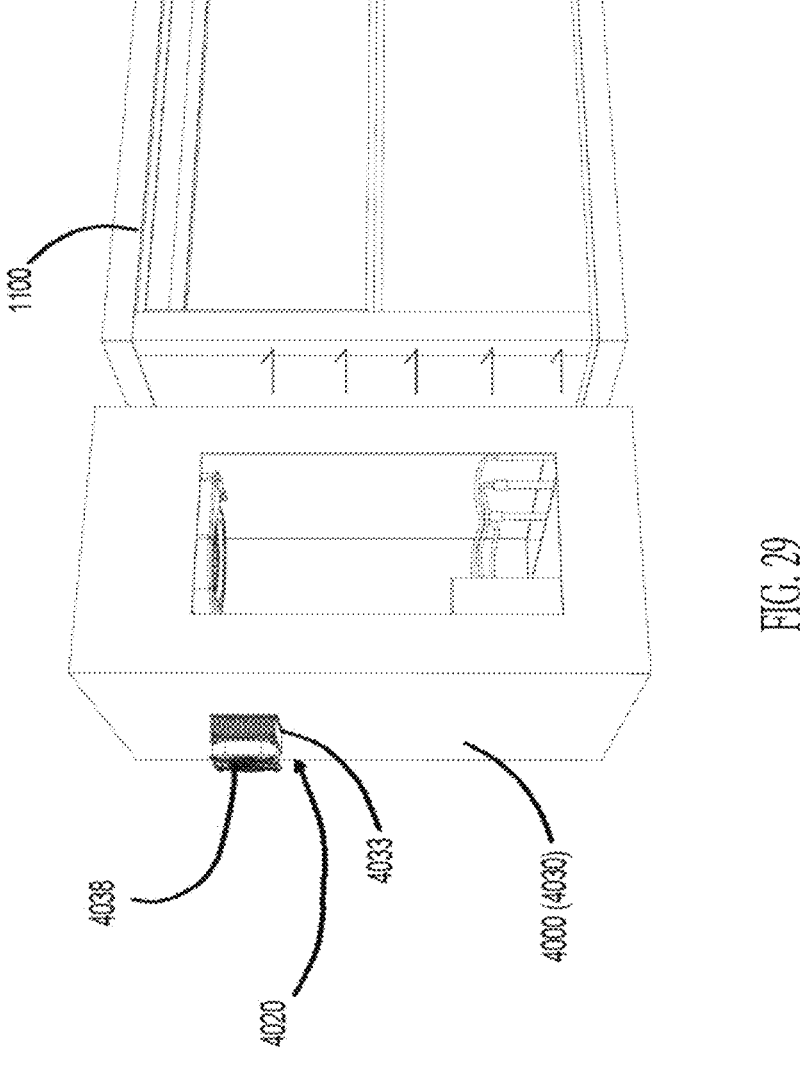
FIG. 29 is a schematic view showing a hermetically enclosed arrangement of a growth box according to the present invention.
Figure 30:
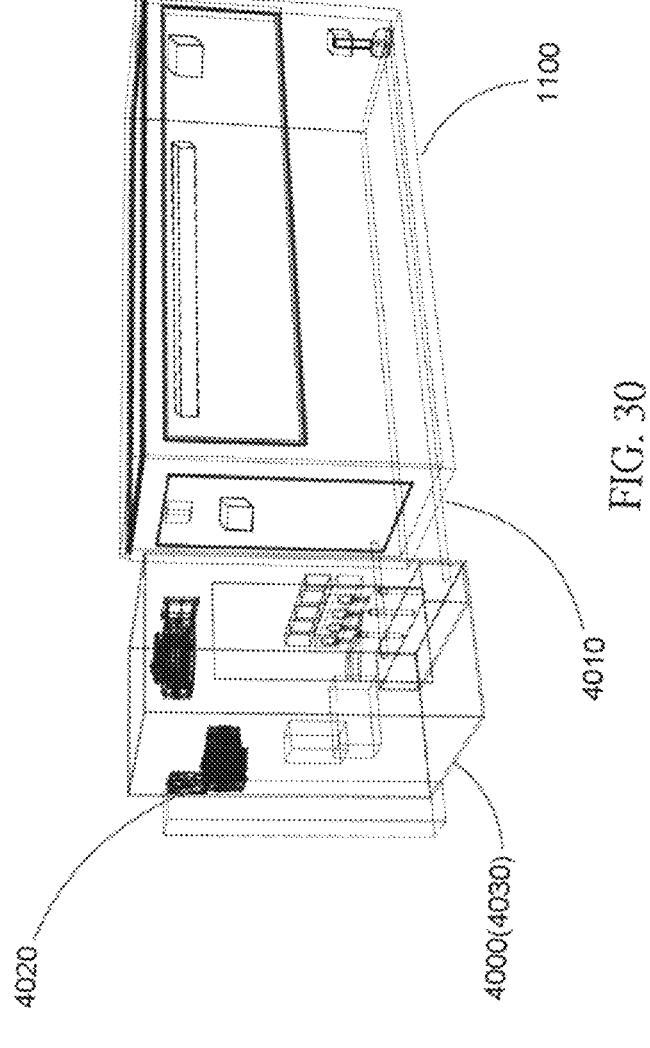
FIG. 30 is a view similar to FIG. 29, but with more structural details illustrated.

In a preferred embodiment, the growth box 71, 72, 73, or 1100 defines a hermetically enclosable interior space of which substance is selectively accessible, and is also selectively confined inside and inaccessible from outside of the growth box. FIG. 29 shows, in a schematic form, a hermetically enclosed arrangement of such a growth box, in which a Peltier cooling system that is operated on Peltier effect to change a temperature inside the growth box by means of thermoelectric cooling. FIG. 30 provides more structural details of the hermetically enclosable growth box.

As shown in FIGS. 29 and 30, a service control box 4000 is mounted to one end of the growth box 1100 and is set in communication with the interior of the growth box 1100 by means of pipes 4010 or ducts extending between the two boxes 1100, 4000 for air circulating therebetween. To keep the growth box 1100 (or a combination of the growth box 1100 with the service control box 4000), while effectively control a temperature of the interior of the growth box 1100, the service control box 4000 is provided with a Peltier cooling system 4100 mounted at one sidewall thereof. Alternatively, the Peltier cooling system can be directly mounted to a sidewall of the growth box 1100, while the service control box is omitted, if desired. In either way, the growth box 1100 or the combination of the growth box 1100 and the service control box 4000 forms an interior space that is hermetically enclosed.

Figures 31, 32, 33:
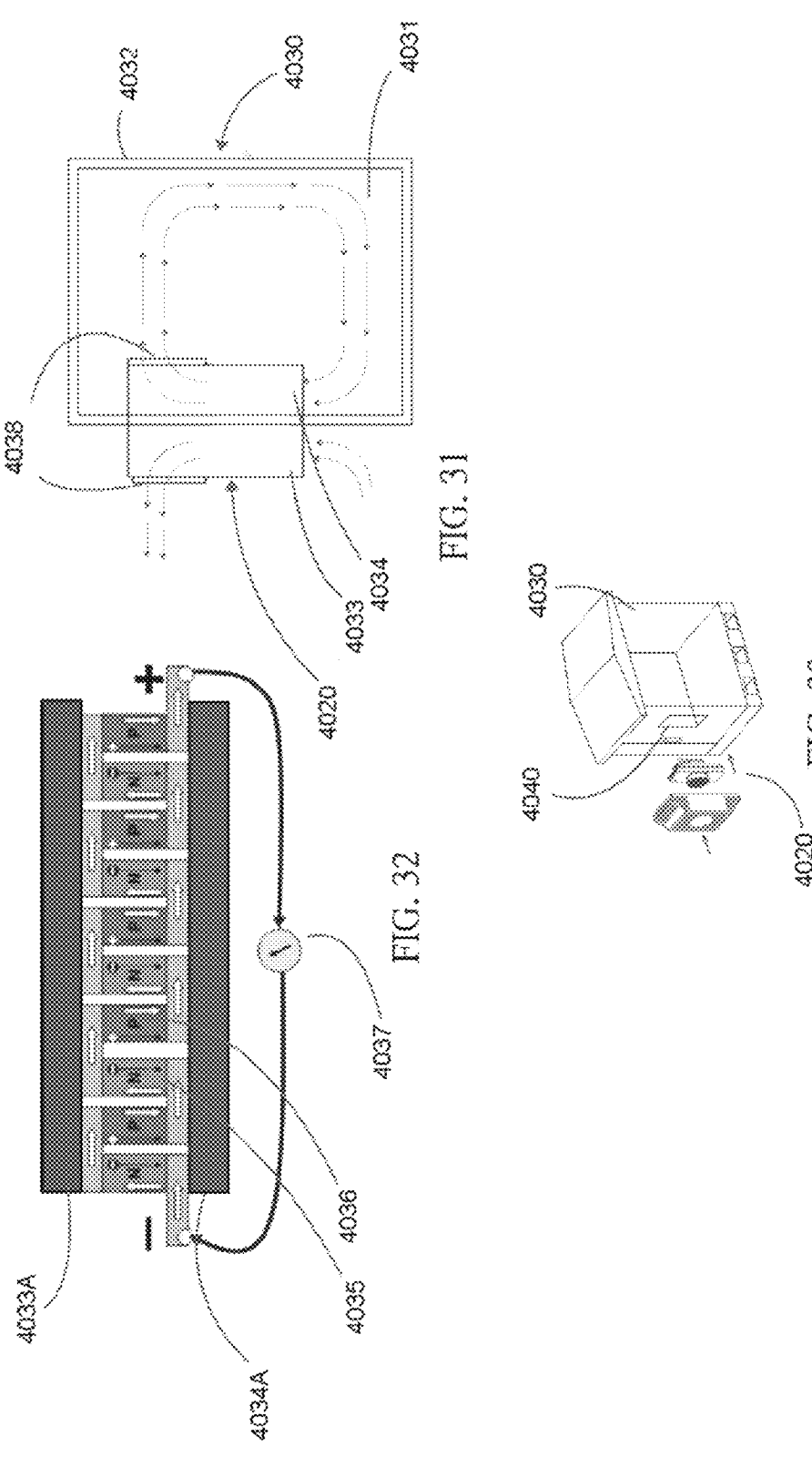
FIG. 31 is schematic view showing an arrangement of a Peltier cooling system mounted to a service control box or a growth box according to the present invention.
FIG. 32 is a schematic view showing a Peltier device serving as a Peltier cooling system applied to the growth box according to the present invention.
FIG. 33 is a schematic view showing mounting of a Peltier cooling system to an enclosure serving as a growth box according to the present invention.

FIG. 31 shows, in a schematic form, the arrangement of the Peltier cooling system mounted to a sidewall of the service control box or the growth box. For easy reference, the service control box or the growth box to which the Peltier cooling system is mounted will be designated at 4020 that is also referred to as an enclosure 4030 for illustration purposes. It is appreciated that the enclosure 4030 may refer to the growth box or the combination of the growth box and the service box. Thus, the enclosure 4030 is formed of sidewalls 4032 that enclose and define a hermetically enclosed interior space 4031 of the enclosure 4030.

The Peltier cooling system 4020 is mounted to the sidewall 4032 of the enclosure 4030 and includes a hot-side portion 4033 and a cold-side port 4034. Although technically, either one of the hot-side portion 4033 and the cold-side portion 4034 can be mounted inside the enclosure 4030, while the other one outside the enclosure 4030, yet for the purposes of regulating the interior temperature of the enclosure 4030 by preventing the interior temperature from exceeding a preset level for simply cooling of the interior of the growth box 1100, in the embodiment illustrated in FIG. 31, the cold-side portion 4034 is arranged on the inside of the enclosure 4030, while the hot-side portion 4033 is on the outside of the enclosure 4030. Electrical connection is established between the hot-side portion 4033 and the cold-side portion 4034. An example of a schematic form of the structure of a Peltier device that form the Peltier cooling system is shown in FIG. 32. The hot-side portion 4033 defines a hot surface 4033A, and cold-side portion 4034 defines a cold surface 4034A. Multiple N-type semiconductors 4035 and multiple P-type semiconductors 4036 are arranged between the hot surface 4033A and the cold surface 4034A in an alternate way, so that spatially, the alternately arranged N-type semiconductors 4035 and P-type semiconductors 4036 are thermally in parallel to, while electrically in series with each other. An electrical power source 4037, which is electrically connected to and controllable by the servo control unit 81, supplies a voltage to two ends of the serially connected N-type and P-type semiconductors 4035, 4036 to induce an electrical current flowing therethrough, so as to develop a temperature difference between adjacent N-type and P-type semiconductors 4035, 4036 to thereby achieving cooling on the cold surface 4034A of the cold-side portion 4034.

Fans 4038 are preferably attached to the cold-side portion 4034 and the hot-side portion 4033 to respectively induce cold air circulation inside the enclosure 4030 and remove heat from the hot-side portion 4033.

In a preferred form, the sidewall 4032 of the enclosure 4030 is formed with an opening 4040, see FIG. 33, and the Peltier cooling system 4020 is fit in the opening 4040 with gaps properly sealed so as to create hermetically enclosed interior space of the enclosure 4030. With such an arrangement, no substance, such as air, exchange is required between the hot-side portion 4033 and the cold-side portion 4034 for temperature regulation of the interior space 4031 of the enclosure 4030.

In a specific example, which is preferred in the invention, the growth box is of a structural arrangement that is selectively enclosed in a hermetic form. Such a hermetic growth box has control functions the ability to change the atmospheric pressure in real time by the user in the range from 400 to 800 ml. mercury column. One of the types of service that the growth box provides is the supply of various gases with the control of the atmosphere formula in the chamber. These functions require high camera performance to support these functions.

Further, for the hermetic form of the growth box, a fiberglass composite material is used. The box design is solid. The design has an open part for the ceiling of the box and the window of the box. The wall thickness of the box is 40 mm. The wall consists of two composite sheets of 5 mm thick, each with 30 mm thick polyurethane foam filled between them. This is important for the thermal conductivity factor. The top of the wall has a 40 mm wide fiberglass strip. This strip is a sandwich cover: composite sheet 5 mm-polyurethane 30 mm-composite sheet 5 mm. It is a continuation of two sheets of composites and has a sealed epoxy resin joint. This strip has a groove for a rubber seal. The sealant in the form of a rectangle is placed in the ditch of the box 2800×600 mm. Double glass with a vacuum layer lies on top of the sealant and presses the sealant with its weight. After the tests, such a structure is hermetic and does not release air when the pressure changes in the range of 400-800 mm. mercury column. On the front of the box in the wall there is a hole for the window. This hole is made according to the principle of the top of the box. along the perimeter of the cut out hole for the window there is a recess groove. A seal is installed in this groove. The window has grooves around the perimeter. When the window is closed, the wall seal enters the window groove. The window closes from top to bottom and, under its own weight, presses the seals. The window has two handles. The handles have the ability to press the window tightly. Handles are threaded and by turning the handles, the window is pressed against the front wall and tightly compresses the seal.

This design guarantees the tightness of the box and pressure control of 400-800 mm. mercury column. Tanks with nutrient solutions, the tank of the root part of the plants are located inside the sealed box. The growth box has one window merged with the service control box. The service control box and the growth box are connected to each other through a rubber seal according to the principle described earlier. The growth box camera window and the service control box have a communication window between them inside the connection perimeter of the two boxes. The service control box has a window. It has the principle of operation and tightness described as for the main box. There is a Peltier cooler in the service control box. There is a window in the wall for him. This window is for dividing the module into heating and cooling. The outer part of the module is heating and the inner part of the module is cooling. The two parts of the Peltier heating and cooling module are separated by aluminum plates. On one side of the plates, a sealing gasket made of foamed polymer material is glued. These plates are larger than the hole for the Peltier module. Cooling part aluminum radiator and fan have a perimeter size equal to the size of the hole in the wall. The module is installed in the hole. Between two aluminum plates there is a wall of the service box. Two plates are connected to each other with fasteners. Each of the plates is pressed against the wall with the side on which the foam seal is glued. The connection of the Peltier module is fully sealed. There are openings for fans in the general box and auxiliary service control box. These fans are mounted through sealing gaskets. Air can enter or exit through these fans only through a system of electric valves that are controlled automatically.

The growth box and the service control box have openings for the exit and entry of nutrient solutions. All openings have electric control valves with automatic control. The growth box and the service control box have openings for the inlet and outlet of pipes and the inlet and outlet. All these openings are provided with special connecting fittings that guarantee tightness.

This design of the growth box and the service control box creates the safety of tightness and allows the use of pressure and gas factors in plant growth studies.

It is further noted that the growth box is a hermetically sealed growing box that can withstand pressure from 400 to 800 mm on mercury column, and pressures is created artificially by hardware and software. The pressure can be controlled automatically. As an example, a mountain environment where plants are growing can be replicated. The air outlet and inlet on the box is a hermetic valve that opens and closes automatically via a controller.

The atmosphere in the growth box can be created by a system user automatically. The system suggests six kinds of gases and atmospheric air. The user can use the suggested gases and atmospheric air to create its own formula automatically. Six gases are preliminary prepared in a specialized factory, such as $CO_2$, $N_2$, $O_2$, $O_3$, $H_2$, $C_2H_4$, or others. Atmospheric air enters the box through a system of filters to guarantee the stopping of pathogens into the box. The system of filters is composed of charcoal filter, photo catalytic filter. Based on the software and equipment for automatic dosing and mixing, a new formula for the chemical composition of the chamber atmosphere is being created. Through the interface of the automatic control system, the user selects the types of gases and their concentration for mixing with the atmosphere of the chamber and its further automatic control and maintenance based on a given formula.

In other words, the present invention provides s a universal complete system of automatic growing of plants with the choice and control of various factors. In the present invention, importantly, the growth chamber has a fundamental arrangement of being hermetic. The concentration of the gas formula is maintained automatically. The user independently determines the concentration of $O_2$ and $CO_2$ gases and others by hours and days for the period of plant growth, and this formula is automatically maintained inside the plant growth chamber during the entire period of plant growth. In the present invention, plant ventilation is carried out inside the plant growth chamber. If necessary, the user can automatically change the air in the growth chamber, which will enter the chamber through the filter system.

It is further noted that the growth box includes special UPVC, EPP foam and composite with PU foam which have low thermal conductivity to guarantee high temperature stability with an accuracy of ±0.1 degrees.

It is further noted that the growth box provides a universal system that includes aeroponic system, ultrasonic humidifier, hydroponic system and dripping irrigation system for the root inside the growing box. There is also an internal fan, an additional $O_2$ and $O_3$ blowing system in the root area. The fans with the valves allow the user to control the hermetic (leakproof) function of the root zone of plants, and gases are supplied automatically according to the user's time setting. UV light is also used and its brightness and operating time is adjustable and automatic depending on the environment situation.

It is further noted that the growth box includes a specially designed and calculated climate control system in the growth box using (1) a Peltier technology system for air cooling and nutrient solution, (2) fans for air heating and drying, (3) films with heating elements around the pant stem on the plant growth board, (4) an air ionizer for controller the positive and negative ions in the air, and (5) electrical wires made of copper to create an electromagnetic field at the top of plant stems with voltage control and turn-on by time settings.

It is further noted that the growth box provides air for ventilation in real time mode for being used according to a predetermined formula and only this air will circulate inside the growth box as a closed spaced without any contact with air from outside. There are two fans on one the upper side of the chamber to supply air. For supplying the air on the other side of the chamber, two other fans are provided at the bottom but above the board separating the step and root parts of the plants. The user can automatically control the fans, such as controlling time, speed, and switching order.

It is further noted that the growth box involves a unique arrangement of LED lamp and control software. The lamp has 16 spectrums, UVB, UVC (280-285 nm) and 250 brightness levels. The user can independently choose the operating time, combinations of spectrum and brightness level, creating an infinite number of combinations for research with PPFD calculation. It is the most important and most complex measure meter for light quality in plant growth and is affected by plant distance, temperature, and humidity. Our system guarantees an accurate PPFD reading. The light control system has a distance sensor situated from the light to the plant leaves. The sensor is located outside the chamber and is on the same level as the LED chips of the lamp, on the camera shelf. The ceiling of the chamber is made of vacuum insulated glass with double ultra-pure layers. This design avoids the problem of heat removal from the chamber. This design allows precise control of the climate inside the chamber.

The difference and composition of LED lamps is the preliminary mixing system of the selected spectrum by the user. This allows the plant to receive uniform illumination of the selected combination of light spectrum. For doing this, a box with mirror reflectors surface and quartz glass at the bottom is used for each LED lighting modules. This design allows the selected light spectrum to pass through the mixing stage and through the quartz glass evenly reach the plant leaves part. Such system allows the user to make high-quality light of different formulas in automatic mode according to the light spectrum for plants without losing it from scattering on the sides of the camera.

It is further noted that the growth box provides a multi-functional arrangement in respect of detection of gases. The growth box may include six gas sensors $CO_2$, $O_2$, $O_3$, $N_2$, $C_2H_4$, which may have the following functions:

(1) They allow to receive information about the situation of the atmosphere in the chamber.

(2) They allow to receive information about the chemical composition of the atmosphere in the chamber and transfer it to the controller to compare with the user's atmosphere settings parameters.

(3) Adjust the formula gases ratio in the atmosphere in the chamber if the chemical composition of the atmosphere deviates from the established formula set by the user.

(4) Give feedback to the controller that the atmosphere composition in the chamber is the same as the installed settings after automatic refilling of the gas or gases necessary to maintain the atmosphere composition.

In other words, the present invention provides lamp illumination with 16 nanometer light spectra, which most influence the regulation of plant growth. The user can select the desired spectrum and independently make the type of lighting. Each spectrum can also have 250 brightness levels. This allows the user to make endless variations of the lighting formula for plants in the automatic mode. The user can independently plan the brightness and spectrum formula the day by the hour and during the entire period of plant growth. The set parameters are automatically supported by the controller software. The lamp is not used inside the chamber, but above the ceiling of the chamber, which is made of vacuum glass. Another feature of the lamp is that the light enters the camera through the spectrum mixing boxes. The walls of the box have a mirror surface, and the bottom of the box is made of quartz glass.

It is also noted that the present invention does not have heat sources inside the growth box. In the automatic mode, the user can decrease and increase the temperature. The temperature sensors at the top of the plant stem will indicate the temperature and humidity inside the box. At the same time, a special heating system is used at the bottom of the stem to create a temperature difference of up to 5 degrees with the temperature in the upper part of the chamber, its automatic adjusting and control system. The user, before using the chamber or during its use, can automatically set the desired temperature in the chamber and the temperature of the film of the board that separates the root and stem parts. Humidity can also be set by the user and, if necessary, a condensate removal system or an increase in humidity through a controlled supply of cold steam using ultrasound can be operated.

It is also noted that in the present invention, a chlorophyll sensor is used to record the information of the plant growing process. It allows the user to determine the situation with nutrient solutions and in general with the growth condition. To determine the size of the leaves, their color, possible diseases, the hyperspectral camera is used, which allows the user to see the subtlest changes in the plants. The camera allows the user to get the spectrum for each pixel of the image with subsequent processing. Depending on the tasks set, the image can be processed and work with the database of plant diseases or other sources of information from a database.

To obtain information about the weight of plants, six sensors are involved. The sensors are installed at the corners of the root part of the plants and in the center on both sides. Weak disk magnets are installed symmetrically on the board, which allow precise contact with the top of the weight sensors. Each sensor is connected to a controller that reads the values of each of the six sensors automatically and shows the real average weight.

It is also noted that in the present invention, a temperature setting and control process has two stages is included.

The first stage of temperature setting is the reactor. After the user automatically selects the type of water and the dosing process, the solution enters the reactor. The reactor has a cooling and heating function. Through the interface, the user sets the desired temperature and the reactor automatically cools or heats the solution to the set temperature and sends it to one of the two tanks of solutions for the root part. The solution for the second tank of nutrient solution is prepared as for the first tank.

The second stage of nutrient solution temperature control is the Peltier cooling unit. It is located between two tanks of nutrient solutions. Each tank has a serpentine at its bottom. The user sets the temperature of the solution via the interface and the controller instructs the cooling unit to cool the nutrient solution through the heat exchanger. The nutrient solution passes in a closed circle through the heat exchanger and coils of the two tanks and is cooled to the desired temperature. At the bottom of two tanks under the coils there is a thermal film. It can be carbon or polyamide or other with a heating function. Temperature sensors are installed in the nutrient solution of the tanks. Sensors transmit information to the controller. If the temperature differs from that set by the user, the controller gives a command to the cooling unit to lower the temperature, or in case of a rise in temperature, it gives a command to turn on the heating of the film. When the desired and set temperature is reached by the user, the controller, after receiving this information from the sensors, turns off the cooling or heating of the nutrient solution from the temperature set by the user.

It is also noted that in the present invention, a unique nutrient solution preparation system is included. The user can choose one of ten types of water, city water, rain water, distilled water, light water with different percentages of deuterium and tritium from the 150 PPM reference water (heavy water 2H2O and 3H2O) 10%, 25%, 40%, 55%, 70%, 85%, 100%. After selecting water, the user chooses chemical reagents, but nano-elements based on metal particles and bacterial products. Nano elements are divided by size. There are 9 size ranges in total (0-10, 10-25, 25-50, 50-75, 75-100, 100-250, 250-500, 500-750, 750-1000 nanometers). There is a dosing device for each size type. Each of the 9 dosing devices for nano particles has 24 tanks of 1L each for their storage with a mixing system. The user selects the type of nano particles, sizes, quantity (from 0.0001 milliliters). The 10th dosing unit is designed for nano particles produced by bacteria, which act as a suppression and destruction of pathogenic bacteria and are plant growth stimulants. After that, there is a reactor for the nutrient solution. In the reactor, the user sets the temperature, PH, EC, DO, stirring speed and time. After setting all the parameters in the reactor, the user chooses the path that the nutrient solution should take to the nutrient solution storage tank. There are five paths (5 pipes), and each path has a feature of changing the structure of water:

(1) cascades of magnets
(2) electric field control around the pipe
(3) Vibration frequency around the pipe
(4) The way to create ultrasound around the pipe
(5) high impulse currents around the pipe.

The user can choose the route of the nutrient solution to the storage tanks and manage these factors through the controller and the available system interface.

In an example, there are three tanks, and in a preferred way, there is a choice of ten kinds of nutrient solution preparation water. Two tanks are used for the root system and one tank is used for the stem system. Tanks are located inside one box or three tanks under three boxes and used by them. The two tanks for the root contain different solution formulas. In each of the three tanks can be a prepared nutrient solution or just use selected water. To prepare the solution, ten (10) types of water are available, including light water with a controlled content of deuterium and tritium. Ten (10) dosing devices are used to prepare the nutrient solution. Each dosing device has 24 different types of nano elements. Nine tanks contain the same set of nano elements, but of different sizes. One tank contains ready to be used formulas of nutrient solutions and plant protection products and clean water. The dosing device has 0.01 milliliter dosing steps with a minimum dose of 0.01 milliliter. The selected elements automatically fall into the selected water passing through the pipe. The solution enters the reactor in which the temperature, pH, and electrical conductivity are set. After that, the solution enters storage tanks to be used for plant growth. An option to restructure the nutrient solution or pure water is available. The whole solution preparation process is automated. The prepared formula is guaranteed to be reproduced and saved in the database which is a very important detail in smart plant growing systems. Each of the 10 dosing devices has a controller, which is integrated with the main control system. Water selection, structural change parameter selection, reactor parameter selection are individually controlled through a main system control interface.

It is further noted that in the present invention, two stages of establishing PH, EC and DO are involved. At the first stage, these parameters are set by the user in the reactor in automatic mode through the system interface, and the controller controls the chemical dosing devices. The reactor has a system for supplying gases from outside and the user sets the level of oxygen saturation of the water. The sensors transmit a signal to the controller and the dosing system for reagents and $O_2$ gas performs the task of establishing the formula of the nutrient solution according to the specified parameters PH, EC, DO. Nutrient solution with these indicators enters the solution storage tanks. The gas supply system is connected to the tanks. The user sets the concentration of $O_2$ and $O_3$ in the nutrient solution via the interface. Through the readings of the oxygen and ozone sensor, the controller maintains the set level of oxygen and ozone saturation of the nutrient solution. The user has the option of using an ozone generator. An ozone generator is installed at the bottom of each tank. The user can select the start time and duration of the generator. The ozone generator turns on and off automatically according to the parameters set by the user. To control and maintain the set PH and EC levels of the nutrient solution, the nutrient solution storage tanks are connected by inlet and outlet tubes to the service box. In service box there is a tank for regulating the PH and EC of the nutrient solution. This tank has PH, EC sensors connected to the controller. Above the PH and EC sensors, dosing devices and four reagent tanks, one liter each, are installed. According to the set parameters and information from the sensors, the controller gives commands to the dosing device to supply the necessary reagents and their quantity to perform tasks according to the parameters set by the user. There is a pump in the corner of each of the two tanks. The pump circulates the solution between the service box tanks and the nutrient solution tanks. When the user selects a vertical system consisting of three chambers with a single tank system, the automatic control of the parameters of the nutrient solution in the tank is performed by a dosing device in each tank. Each tank has sensors and a dosing device to control PH and EC. Four tanks of reagents with a capacity of one liter each are shared. Each tank is connected to the gas supply system and controls the concentration of $O_2$ and $O_3$ automatically based on the controller set parameters by the user through the system interface, which give information to the controller to enable dosing of reagents in the desired tank.

It is also noted that the present invention provides an arrangement in which a filter is directly built into the lower tank (or also referred to as "root tank") of a two-tank growth box. The root tank has three openings with coarse filters under each solution tank. Each filter has an automatic valve. Information about the selected solution enters the controller and the water outlet valve will open only above the used solution tank. After filtration, the nutrient solution enters the desired solution storage tank without mechanical impurities.

This is a unique principle used to eliminate bacteria, viruses, mold and algae growth. The solution tank directly uses an ozone generator and can use directly prepared $O_3$ gas. Ozonation of the nutrient solution prevents the formation of pathogens and keeps the solution sterile. Two systems for the use of ready $O_3$ gas through the control of the controller and taking into account the set parameters by the user or the use of an $O_3$ generator allow the user to choose the desired system using $O_3$ gas or a generator producing $O_3$ independently in automatic mode.

It is further noted that the present invention provides an arrangement in which the liquid ingredients are pre-prepared. Each jar with nano elements and ingredients has a mini mixer and a filter. Accidentally caught dust remains in the can filter. The filter is located at the top of the reagent tank and when filled with pure liquid nano solutions, the filter cuts off the possible risks of dust ingress with air. The nutrient solution prepared with the dosing of nanoparticles has no impurities and the nutrient solution enters the nutrient solution storage tank absolutely clean.

It is also noted that, in a preferred embodiment, the present invention provides an arrangement of selectively setting up four automatic systems for one plant growth chamber, hydroponics, aeroponics, drip irrigation, and cold steam. The user for one plant growth chamber has three tanks of nutrient solution. Each tank may have a different solution. The user independently controls remotely what type of nutrition to choose for the roots of plants, from which tank to use the solution, when and how much to feed the plant growth chamber to the root part of the plants. The temperature of the nutrient solution is set by the user according to the set schedule. The temperature of the nutrient solution can not only decrease, but also increase automatically. To maintain the temperature of the nutrient solution in the tanks, a coil with a Peltier-based cooling module is used and for heating, an electric heating of a carbon, polyamide or other film is used with temperature control through a thermostat and a controller. This whole system is located in a compartment between two large tanks of nutrient solution.

Also, the root tank has three filters installed where the nutrient solution drains into the solution storage tank. Each filter with a hole is located above each of the three tanks. Each drain hole has an automatic valve. The system controller automatically opens the valve to drain the nutrient liquid into the tank from which water was sent to the plant root supply tank.

Factor #1—Temperature Management and Control of the Nutrient Solution in the Tanks of the Box To control and maintain water temperature, equipment based on a Peltier semiconductor element and a tube system is used. The user can control the intensity of the semiconductor cooling through the current control in the Peltier element. A system of closed tubes filled with a special liquid touches the Peltier plate and the liquid in them is cooled to the temperature of the semiconductor. The tubes cover the bottom of the nutrient solution tank and the nutrient solution is cooled to the temperature of the tubes with liquid.

Factor #2—Management and Control of the Supply of Nutrient Solution to the Root Part of the Plant The user can set the on and off time of a pump. The user can set the duration of the pump run time. The user can also select the type of pump. The nutrient solution can be supplied through two types of low and high pressure pumps. The low pressure pumps are used for drip irrigation and hydroponic systems. High pressure pumps are used for the aeroponics system. (The drip irrigation, hydroponic, and aeroponics systems have been discussed above with reference to the previous embodiments.)

Factor #3—Management and Control of the Parameters of the Nutrient Solution

The user can set and change the parameters of electrical conductivity and P/H of nutrient solution, which is located in the lower tank. The system of sensors that is located in the nutrient solution provides the user with information about these parameters.

If the sensor indicators differ from the set parameters by the user during preliminary preparation of the nutrient medium in the reactor, the user is able to automatically send the nutrient medium to the reactor again and change the parameters of the nutrient solution to the desired ones.

Factor #4—Moisture Control in the Growth Tank of the Root Part of the Plant

The user has a humidity sensor and when the humidity drops below normal, the water mist supply system is turned on.

Water is automatically supplied from the lower tank and sprayed into the tank for the root of the plant through nozzles. If the humidity level is higher than normal, the fan is turned on to draw out moist air and supply the air with lower humidity to the tank from the outside.

Factor #5—Control of the UV and UVC Lamp in the Growth Tank of the Root Part of Plants The lamp has two types of LEDs with UV and UVC spectra. The user can choose the type of light, its duration and the on and off time.

Factor #6—Control of the Electrophoresis Process in the Root of the Plant

The user can select the time for turning on the electricity, its duration and its current strength Factor #7—Management and Control of Passage of the Nutrient Solution in the Form of a Liquid in the Root Part When a hydroponics system is selected, the user selects the time for switching on the low-pressure pump to supply the nutrient solution and its time spent in the tank as well as its rhythm of switching on.

Factor #8—Management and Control of Passage of the Nutrient Solution in the Form of Fog in the Root Part When an aeroponics system is selected, the user selects the time for switching on the high-pressure pump to supply the nutrient solution to the tanks through the spraying system with high-pressure nozzles in the form of steam, selecting the rhythm of switching on and the duration of steam supply.

Factor #9—Selection and Supply of Gases to the Root Part of the Plant

When an aeroponics system is selected, the user has the opportunity to select the gas, its concentration and volume for supplying to the root part of the plant. The user can control the start time of the supply, duration and rhythm of the supply.

Factor #10—Ability to Automatically Select a Growth Medium

The user can automatically select a growth medium for use in the root of the plant from a first or a second compartment of the upper tank.

Factor #11—Ability to Automatically Replace the Growth Medium in One of the Compartments of the Upper Tank The user has the ability to automatically drain the unnecessary growth medium from one of the compartments of the lower tank. After that, the user can prepare a new growth medium for the full technological cycle of preparation and pour it into the tank compartment again.

Factor #12—Control of the Temperature in the Box of the Stem Part of Plant (Decreasing the Temperature)

The user can set the desired temperature in the box at different periods of the day, month, or year. Temperature sensors are used to measure temperature.

To control and maintain air temperature, equipment based on Peltier semiconductor and a fan on one side of the box are used, see FIG. 16.

The user can control the cooling of the semiconductor radiator inside the box through the control of the current passing through the Peltier element.

The second radiator, which heats up, is located on the outside of the box. A fan is attached to the semiconductor radiator, which carries the cooled air throughout the box.

Factor #13—Control of the Temperature in the Box of the Stem Part of Plant (Increasing the Temperature)

The user can set the desired temperature in the box at different periods of the day, month, or year. Temperature sensors are used to measure temperature.

To control and maintain air temperature, equipment based on Peltier semiconductor and a fan on one side of the box are used, see FIG. 16.

The user can control the heating of the semiconductor radiator inside the box through the control of the current passing through the Peltier element.

The second radiator, which cools down, is located on the outside of the box. A fan is attached to the semiconductor radiator, which carries the cooled air throughout the box.

Factor #14—Control of Temperature Increase in the Lower Part of the Stem

The user can set the desired temperature at different periods of the day, month, or year. Sensors are used to measure temperature.

To control the temperature of the air around the bottom of the stem, a film that is attached to the top of the plate is used. The plate separates the root and stem parts of the plant.

A special film with carbon fibers covers the entire plate and has holes for stems. When current is passed through carbon filaments, which are located in a circle around the hole, the film is heated.

At the same time, the bottom of the plant and the top of the plant have different temperatures, which are regulated by the user through control of the amount of current passing through the carbon filaments.

Factor #15—Humidity Control in the Stem Part of Plants

The user sets the desired value of humidity, the time of setting humidity, the duration of its maintenance.

There are two humidity sensors in the box to measure the humidity level. When the humidity is low, the controller automatically turns on the water mist to balance the humidity with the parameters set by the user.

At high humidity, the controller turns on the air cooler without turning on the internal fan. At the same time, on the opposite side of the box, the controller turns on the heating of the air through another Peltier semiconductor with a fan. This is necessary to compensate for the drop in air temperature.

Due to the fact that the temperature of the cooling plate becomes lower than the air temperature, dew appears on it and then flows into the lower tank as drops of water.

After reaching the desired humidity, the controller turns off the function of lowering the humidity and balances all the specified parameters by the user in the box with the stem part of the plant.

Factor #16—Control and Management of the Spectrum of Lighting Inside the Box

The design of the box is made so that the LED lighting lamp is located outside the plant growth box. The upper part of the box is made of special diffuse glass with a vacuum interlayer to maintain a stable temperature in the box.

The light stream from the LED lamp passes through the glass, but due to the special design of the glass, the heat generated by the LEDs goes outside of the plant growth box.

Flat LED luminaire consists of three identical LED-lamps with a size of 500×500 mm. The lamp is made in the form of a thin aluminum plate onto which LED chips are applied with different wavelengths from 300 to 800 nanometers.

The radiation wavelengths of LED chips correspond to different peaks in the spectrum of sunlight. The design of the LED chips is such that the chips of each wavelength differ in the angle of illumination and illuminate a surface measuring 600×600 mm.

Three LED lamps cover an area of 1800×600 mm.

In total, there are 36 types of LED chips on the plate, combined into 36 groups that differ in the wavelength of light.

The placement design is made so that the inclusion of any of the 36 groups covers an area of 600×600 mm. They are placed in a way that if any of the 36 groups is turned on, it covers an area of 600×600 mm.

The software allows to set 256 shades of color for each of the 36 groups of LED chips.

Thus, the user has the opportunity to choose different combinations of the light spectrum based on the available 36 groups of LED chips and select one of 256 shades of the glow of each group.

This allows the user to have many options for a wide variety of combinations and have an archive to control their use.

The user can also use the software to set the desired combination of lighting and its operating time during the day, month, or year.

Factor #17—Control and Brightness Management of Lighting Inside the Box

Through the voltage changes the user can set the desired brightness of the LED lamp and its operating time. An optical sensor is provided at the top of the box. The user can set the brightness of the lighting in the box at a distance from the lamp to the plant. When the plant grows and approaches the lamp, the optical sensor will inform the controller about this and the controller will reduce the lamp brightness so that the specified amount of light is constantly at the top of the plant.

Factor #18—Control and Management of the Gas Atmosphere Inside the Box

To control and manage the atmosphere inside the box, the user can use nine gases: $CO_2$, $O_2$, $O_3$, $H_2$, NO, $N_2$, $C_2H_4$, $H_2S$.

In the box there are 9 sensors that provide information on the concentration of gases. The box has a completely sealed design, which allows to provide and keep the desired composition of the atmosphere inside.

Before using gases, the user selects the required gases and their concentration through the control interface.

There are restrictions on the concentration and combination of gases in the software for safety requirements.

In the box, there is a gas discharge system through the automatic opening of the valve when the pressure level is exceeded or when the types of gases are replaced by the user.

To maintain an accurate gas concentration, a system of 9 gas sensors and a gas meter is provided.

Factor #19—Control and Analysis of Plant Growth by its Weight

One of the important indicators of plant growth is weight gain. For these purposes, eight sensors are installed under the plant growth plate on the tank of the root part of the plan, which weigh each minute. Based on the data received from the sensors and available software, a diagram is formed throughout the entire process of plant growth.

Factor #20—Control Factors and Analysis of Plant Growth by Indicators of the Chlorophyll Process in Leaves Measuring the chlorophyll content gives an indicator of photosynthetic activity related to the concentration of nitrogen in the sample. It is especially important to carry out these measurements in plant growth programs, if necessary, carefully monitor the effects of nitrogen addition to the crop and other applied factors. A special integrated clip for the leaf allows instant measurements that do not damage the leaves. The received information in real time allows the user to monitor the health of the photosynthesis system inside the sheet, taking into account the application of various factors. Factor #21—the Factor of Soil Condition Monitoring by Drip Nutrition.

An important factor for monitoring the soil and its condition is its electrical conductivity.

The EC measures the soil's ability to conduct electric current using salt properties to conduct it, so the EC measures the concentration of soluble salts present in the soil solution. The higher the value, the easier it is for a specified current to pass through the same soil through a higher salt concentration. This factor is important for studies on the influence of salts and their concentrations on the electrical conductivity of the soil and the effect of its level of conductivity on plant growth.

Factor #22—the Factor of Music

On two sides of the plant growth box, two speakers are located. The user has the opportunity to play different music, melodies, songs, sounds of different frequencies and more through the speaker, using the software to control it. The user can choose the type, power, start time, end and duration of the experiment.

Factor #23—the Vibration Factor

The lateral part of the plant growth plate is equipped with a mechanism creating that creates a vibration with an amplitude of 0-60 Hertz with an impact amplitude of 0.5-1 mm.

This factor allows you to control the development of the stem and root system of plants by using vibration. Under the action of a drive, for example, an eccentric mechanism, it makes a linear horizontal reciprocating motion and thereby creates a kinematic vibrational disturbance on the plate and thereby on the plants that are on this plate and on the root part.

The user has the ability to set the amplitude of the vibration, its beginning and end as well as its duration.

Factor #24—Pressure Factor

The box for growing plants has a design that controls tightness. The box can withstand fluctuations in internal pressures plus/minus 30% from 760 mmHg. Art. in the GHS system and is equivalent to 1.01325 bar or 101 325 Pa in the International System of Units (SI).

In the box, there is a pressure sensor that displays data of pressure in the box. The user can set the pressure in the aisles to plus/minus 30%, and control the set pressure parameters in the box through the air injection compressor and the vacuum compressor.

This factor is important for conducting a study of plant growth in different countries of the world, taking into account the specific pressure in each region.

Factor #25—Factor of Accounting and Analysis

Factor of accounting and analysis is the archive and library of user research. The user can also use a common archival database, where the user can use different factors and their parameters for the research.

I claim:

1. A plant growing system, comprising a growth medium preparation unit and a plant growing unit, wherein the growth medium preparation unit comprises:

a water supply module that comprises at least one water supply unit, which supplies a source of water through a pipeline sub-system;

a water treatment unit that is connected to the water supply module through the pipeline sub-system to receive water from the source of water, the water treatment unit comprising at least one channel in which predetermined treatment is applied to the water;

a nutrition module that is connected to the pipeline sub-system and comprises at least one nutrition unit, which supplies, through a dosing system, an element in the form of one of a nano-element, a micro-element, and a macro-element to, the water from the source of water;

a reactor sub-system that is connected to the pipeline sub-system and includes a mixing unit for mixing at least one type of gas from a gas supply source in the water supplied through the pipeline sub-system and includes the element supplied from the nutrition module added therein; and a reactor that receives the water supplied through the pipeline sub-system to flow therethrough and is operable for selection among a plurality of growth medium parameters applied to the water to provide a modified type of water that carries a nutrition formula according to the treatment applied to the water from the source of water and the gas and the element introduced into the water; and wherein the plant growing unit is connected to the pipeline sub-system to receive the modified type of water through the pipeline sub-system, the plant growing unit comprising multiple growth boxes that are connected to the pipeline sub-system, each of the growth boxes comprising:

a box body having an interior space hermetically enclosed and defined by sidewalls and a base to form a hermetically enclosed chamber;

a tank assembly received in the interior space of the box body and having an interior space into which the modified type of water that carries the nutrition formula is fed in a predetermined form; and at least one plant plate, which is disposed on a top of the tank assembly and covers at least a part of an opening formed in the top of the tank assembly, wherein the at least one plant plate is formed with at least one opening extending completely through the at least one plant plate and adapted to hold a plant therein such that a root of the plant is located in the interior space of the tank assembly and a stem of the plant is located above the at least one plant plate and in a void space of the hermetically enclosed chamber of the box body;

wherein a cooling system is arranged on the box body to regulate a temperature of an interior of the hermetically enclosed chamber of the box body, wherein the cooling system comprises a cold-side portion arranged in the interior space of the hermetically enclosed chamber of the box body and a hot-side portion arranged outside the box body, and wherein a service control box is mounted to one side of the growth box and in communication with the hermetically enclosed interior space of the box body, the service control box forming a hermetically enclosed space in combination with the hermetically enclosed interior space of the box body so as to define a combined hermetically enclosed space, wherein the cooling system comprises a Peltier device, which is fit in an opening formed in a wall enclosing the combined hermetically enclosed space of the box body and the service control box to have the cold-side portion located in the interior space of the box body and the hot-side portion located outside of the wall.

2. The plant growing system according to claim 1, wherein the cooling system comprises a Peltier device, which is fit in an opening formed in a wall of the box body to have the cold-side portion located inside the box body and the hot-side portion located outside the box body.

3. The plant growing system according to claim 1, wherein the cooling system comprises a Peltier device, which is fit in an opening formed in a wall of the service control box to have the cold-side portion located inside the service control box and in communication with the interior space of the box body and the hot-side portion located outside the service control box.

4. The plant growing system according to claim 1, wherein the tank assembly comprises at least one tank disposed in the chamber of the box body, the at least one tank having an interior space in which an aeroponic system is arranged, wherein the aeroponic system comprises an air humidifier arranged in the tank, the air humidifier comprising an ultrasonic transducer that is operable to convert the modified type of water into the predetermined form that includes water droplets/vapor.

5. The plant growing system according to claim 4, wherein the at least one tank of the tank assembly comprises a lower tank received in the box body and an upper tank stacked atop the lower tank, the lower tank having an interior space in which an aeroponic system is arranged, wherein the aeroponic system comprises an air humidifier arranged in at least one of multiple compartments formed in the lower tank, in which an amount of the modified type of water is accumulated, the air humidifier comprising an ultrasonic transducer disposed in the amount of the modified type of water and operable to convert the modified type of water into the predetermined form that includes water droplets/vapor, a cover plate being arranged atop the lower tank and separating an interior space of the upper tank from the interior space of the lower tank, at least one opening being formed in the cover plate to release the water droplets/vapor into the interior space of the upper tank.

6. The plant growing system according to claim 1, wherein the tank assembly comprises at least one tank disposed in the chamber of the box body, the at least one tank having an interior space in which a drip irrigation system is arranged, wherein the drip irrigation system comprises a pump that feeds the modified type of water into a pipe arranged in the interior space of the at least one tank so that drips of the modified type of water are dispensed from a nozzle connected to the pipe toward a confined area around the plant.

7. The plant growing system according to claim 6, wherein the confined area is defined by a pot arranged in the interior space of the at least one tank.

8. The plant growing system according to claim 1, wherein the tank assembly comprises at least one tank disposed in the chamber of the box body, the at least one tank having an interior space in which a hydroponic system is arranged, wherein the hydroponic system comprises a pump that selectively feeds the modified type of water into the interior space of the at least one tank or drains the modified type of water out of the at least one tank, so that a predetermined amount of the modified type of water is accumulated in the interior space of the at least one tank.

9. The plant growing system according to claim 1, wherein the tank assembly comprises at least one tank disposed in the chamber of the box body, wherein an electric unit comprises a voltage control unit and two electrodes that are connected to the voltage control unit and arranged in the interior of the at least one tank and spaced from each other around the plant.

10. The plant growing system according to claim 9, wherein at least one of the two electrodes comprises at least one electric wire arranged in the interior of the at least one tank.

11. The plant growing system according to claim 10, wherein one of the two electrodes comprises a plate that is spaced from and opposite to the at least one electric wire of the at least one of the two electrodes.

12. The plant growing system according to claim 9, wherein the two electrodes are each formed of an electric wire, and the electric wires of the two electrodes are spaced from and opposite to each other.

13. The plant growing system according to claim 1, wherein the tank assembly comprises at least one tank, the at least one tank having an interior space in which a weighing system is arranged, wherein the weighting system comprises at least one weight sensor disposed on a top end of a pillar mounted in the interior space of the at least one tank, such that the at least one plant plate is supported on the top end of the pillar through the at least one weight sensor located between the pillar and the plant plate, the at least one weight sensor being configured to detect and record weight of the at least one plant plate and the plant held in the at least one opening of the at least one plant plate.

14. The plant growing system according to claim 1, wherein the tank assembly comprises at least one tank, the at least one tank having an interior space in which a temperature regulation system is arranged, wherein the temperature regulation system comprises a temperature regulation device and at least one temperature varying member connected to the temperature regulation device and arranged in the interior space of the at least one tank.

15. The plant growing system according to claim 14, wherein the temperature regulation device comprises a chiller device and the at least one temperature varying member comprises a chiller coil connected to and in communication with the temperature regulation device.

16. The plant growing system according to claim 14, wherein the temperature regulation device comprises a heating control unit and at least one temperature varying member comprises a heating member connected to the heating control unit.

17. The plant growing system according to claim 1, wherein the tank assembly comprises at least one tank, the at least one tank having an interior space in which at least one fan is arranged to cause circulation of air in the interior space.

18. The plant growing system according to claim 1, wherein the tank assembly comprises at least one tank, the at least one tank having an interior space in which at least one ultraviolet light (UV) light source is arranged.

19. The plant growing system according to claim 18, wherein the at least one UV light source comprises multiple UV light sources arranged in pair in the interior space of the at least one tank.

20. The plant growing system according to claim 1, wherein the tank assembly comprises at least one tank, the at least one tank having an interior space in which at least one filter is arranged.

* * * * *